(12) United States Patent
Brandes et al.

(10) Patent No.: US 10,359,145 B2
(45) Date of Patent: Jul. 23, 2019

(54) DISPLAY SYSTEM

(71) Applicant: UBS Business Solutions AG, Zurich (CH)

(72) Inventors: Roland Brandes, Eggenwil (CH); Christoph Einsele, Erlenbach (CH)

(73) Assignee: UBS Business Solutions AG, Zurich (CH)

( * ) Notice: Subject to any disclaimer, the term of this patent is extended or adjusted under 35 U.S.C. 154(b) by 111 days.

(21) Appl. No.: 14/858,987

(22) Filed: Sep. 18, 2015

(65) Prior Publication Data
US 2017/0086309 A1 Mar. 23, 2017

(51) Int. Cl.
F16M 11/00 (2006.01)
G09F 9/00 (2006.01)

(52) U.S. Cl.
CPC .............. F16M 11/00 (2013.01); G09F 9/00 (2013.01); A47B 2200/0085 (2013.01)

(58) Field of Classification Search
CPC .... A47B 2021/0364; A47B 2200/0079; A47B 23/043; G06F 1/1681
See application file for complete search history.

(56) References Cited

U.S. PATENT DOCUMENTS

| | | | | |
|---|---|---|---|---|
| 4,305,563 A * | 12/1981 | Presson | ................... | A47B 11/00 108/140 |
| 4,561,619 A * | 12/1985 | Robillard | ............... | A47B 21/03 108/143 |
| 4,637,666 A * | 1/1987 | Worrell | ................... | A47B 21/03 108/143 |
| 4,659,048 A * | 4/1987 | Fahrion | ................... | A47B 21/03 108/102 |
| 4,686,698 A | 8/1987 | Tompkins et al. | | |
| 4,732,059 A * | 3/1988 | Bonner | ................... | B25B 13/44 81/53.2 |
| 4,733,618 A | 3/1988 | Sarro et al. | | |
| 5,931,102 A * | 8/1999 | Grahl | ................... | A47B 17/033 108/143 |
| 6,237,507 B1 * | 5/2001 | Yanagisawa | ....... | A47B 21/0073 108/3 |
| 6,398,176 B1 * | 6/2002 | Liu | ..................... | A47B 21/0314 108/136 |
| 6,532,146 B1 | 3/2003 | Duquette | | |

(Continued)

Primary Examiner — David R Dunn
Assistant Examiner — Christopher E Veraa
(74) Attorney, Agent, or Firm — Pillsbury Winthrop Shaw Pittman LLP

(57) ABSTRACT

A display system includes a table, a track carried by the table, a display device, a mount member, and an orienting mechanism. The mount member is slidable on the track to different locations on the track to enable the display device to be located at the different locations on the track. The orienting mechanism is constructed and arranged to be operatively connected to the display device and the mount member and to facilitate movement of the display device between a first configuration in which the display device is configured to be positioned substantially parallel to a top surface of the table, and a second configuration in which the display device is configured to be substantially inclined with respect to the top surface of the table. The orienting mechanism includes a biasing mechanism that, when actuated, moves the display device from the first configuration to the second configuration.

22 Claims, 24 Drawing Sheets

(56) References Cited

U.S. PATENT DOCUMENTS

| | | | |
|---|---|---|---|
| 6,553,919 B1* | 4/2003 | Nevin | A47B 21/0073 108/25 |
| 6,829,807 B2 | 12/2004 | Kim | |
| 6,850,407 B2 | 2/2005 | Tanimoto et al. | |
| 6,892,650 B2 | 5/2005 | Baloga et al. | |
| 7,032,523 B2* | 4/2006 | Forslund, III | A47B 21/00 108/50.01 |
| 7,127,332 B2* | 10/2006 | Strohmeier | B60R 11/0205 108/44 |
| 7,283,355 B2 | 10/2007 | Han | |
| 7,308,733 B2 | 12/2007 | An et al. | |
| 7,515,405 B2 | 4/2009 | Lev et al. | |
| 7,561,413 B2* | 7/2009 | Kyouzuka | G06F 1/162 248/921 |
| 7,595,978 B2 | 9/2009 | Chen et al. | |
| 7,677,182 B2* | 3/2010 | Mueller | A47B 21/00 108/50.01 |
| 7,836,834 B2* | 11/2010 | Brault | A47B 13/003 108/140 |
| 7,957,129 B2* | 6/2011 | Watanabe | F16M 11/10 16/337 |
| 8,037,832 B2 | 10/2011 | Pellegrini | |
| 8,407,944 B2* | 4/2013 | Baloga | A47B 87/002 52/234 |
| 8,564,949 B2 | 10/2013 | Du et al. | |
| 8,567,735 B2 | 10/2013 | Burgess et al. | |
| 8,611,076 B2 | 12/2013 | Wetzel et al. | |
| 8,695,510 B2 | 4/2014 | Johnson et al. | |
| 2001/0018882 A1* | 9/2001 | Recknagel | A47B 21/0314 108/50.01 |
| 2002/0153812 A1* | 10/2002 | Hellwig | H05K 7/1425 312/223.1 |
| 2002/0194791 A1* | 12/2002 | Baloga | A47B 21/00 52/36.1 |
| 2002/0194792 A1* | 12/2002 | Feldpausch | F16M 11/08 52/36.1 |
| 2004/0012920 A1* | 1/2004 | Tanimoto | G06F 1/162 361/679.27 |
| 2007/0058092 A1 | 3/2007 | Ryu | |
| 2007/0230095 A1* | 10/2007 | Wu | G06F 1/16 361/679.27 |
| 2008/0072801 A1* | 3/2008 | Korber | A47B 21/0073 108/7 |
| 2008/0116771 A1* | 5/2008 | Green | A47B 81/06 312/7.2 |
| 2012/0312199 A1* | 12/2012 | Johnson | A47B 21/0073 108/50.11 |
| 2013/0063382 A1 | 3/2013 | Feldstein et al. | |
| 2014/0340828 A1* | 11/2014 | Truong | G06F 1/1601 361/679.22 |

* cited by examiner

DISPLAY SYSTEM

BACKGROUND

Field

The present patent application relates to a display system.

A display system may generally include a display device (e.g., a display monitor or screen) and a mechanism configured to control the movement and/or positioning of the display device. The display device may be an output device that is generally used for presentation of information or data in visual form. The information may be digital content that is supplied as an input, electrical signal from one or more sources such as a computer system, a digital video disk (DVD) player, a storage server or other sources. The display device may also be used as an input device where a user can provide input or control an information processing system of the computer system through touch gestures by touching the display device.

The present patent application provides improvements over prior art display systems.

SUMMARY

One aspect of the present patent application provides a display system. The display system includes a table, a track carried by the table, a display device, a mount member, and an orienting mechanism. The display device is constructed and arranged to display visual content to a user. The mount member is constructed and arranged to mount the display device on the track. The mount member is slidable on the track to different locations on the track to enable the display device to be located at the different locations on the track. The orienting mechanism is constructed and arranged to be operatively connected to the display device and the mount member and to facilitate movement of the display device between a first configuration in which the display device is configured to be positioned substantially parallel to a top surface of the table, and a second configuration in which the display device is configured to be substantially inclined with respect to the top surface of the table. The orienting mechanism includes a biasing mechanism that, when actuated, moves the display device from the first configuration to the second configuration.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIGS. 1A and 1B show the display device in its first and second configurations, respectively;

FIGS. 4 and 5 show stop members configured to stop the sliding movement of a carrier at the end portions of a track in accordance with an embodiment of the present patent application;

FIGS. 9A and 9B show a pre-loaded elongated torsion spring member and a damper of the orienting mechanism, respectively and some of the portions of the display system in FIGS. 9A and 9B are removed to better illustrate the construction of the remaining portions of the display system;

DETAILED DESCRIPTION

Figure 1:
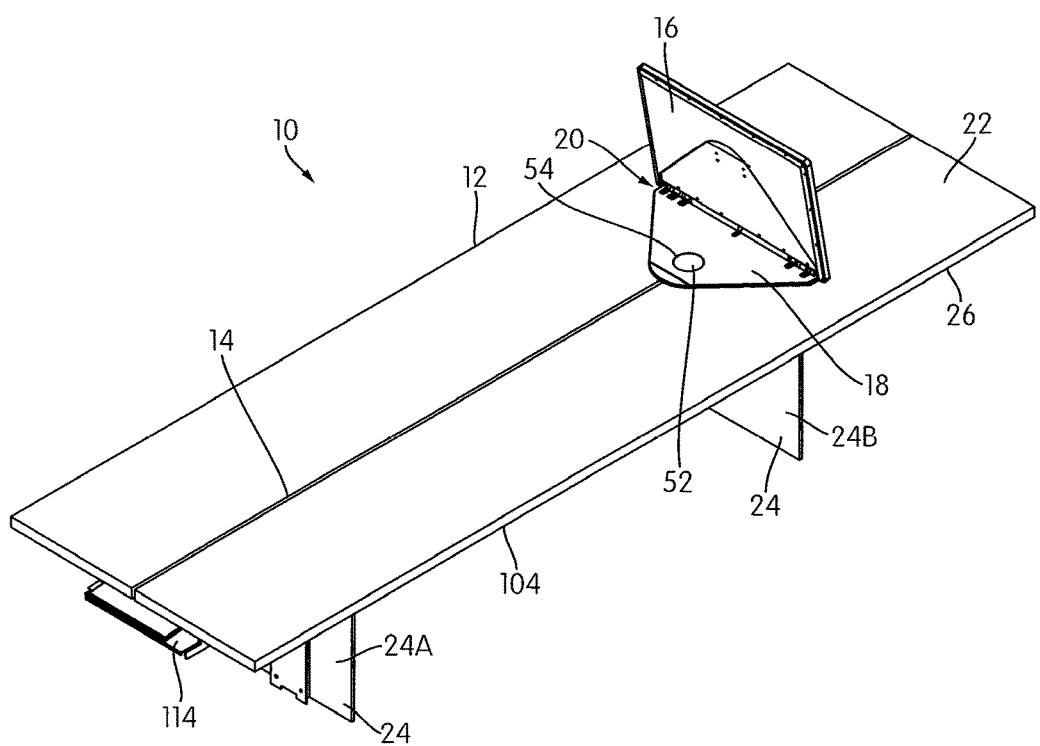
FIGS. 1 and 2 show a perspective view and a top plan view of a display system for providing multiple viewing configurations for a display device in accordance with an embodiment of the present patent application.

FIG. 1 shows a display system 10. The display system 10 includes a table 12, a track 14 carried by the table 12, a display device 16, a mount member 18, and an orienting mechanism 20 (as shown clearly in FIGS. 9 and 13). In one embodiment, as will be clear from the discussion below, the display system 10 is configured to provide multiple viewing configurations or positions for the display device 16.

Figure 1A:
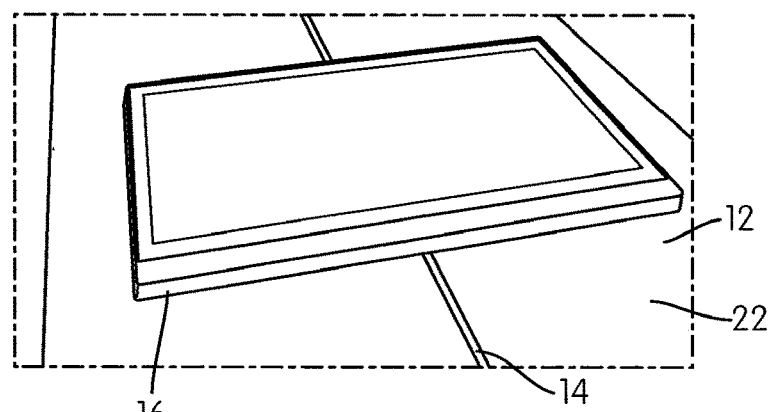
FIGS. 1A and 1B show perspective views of the display device in accordance with an embodiment of the present patent application, where
Figure 1B:
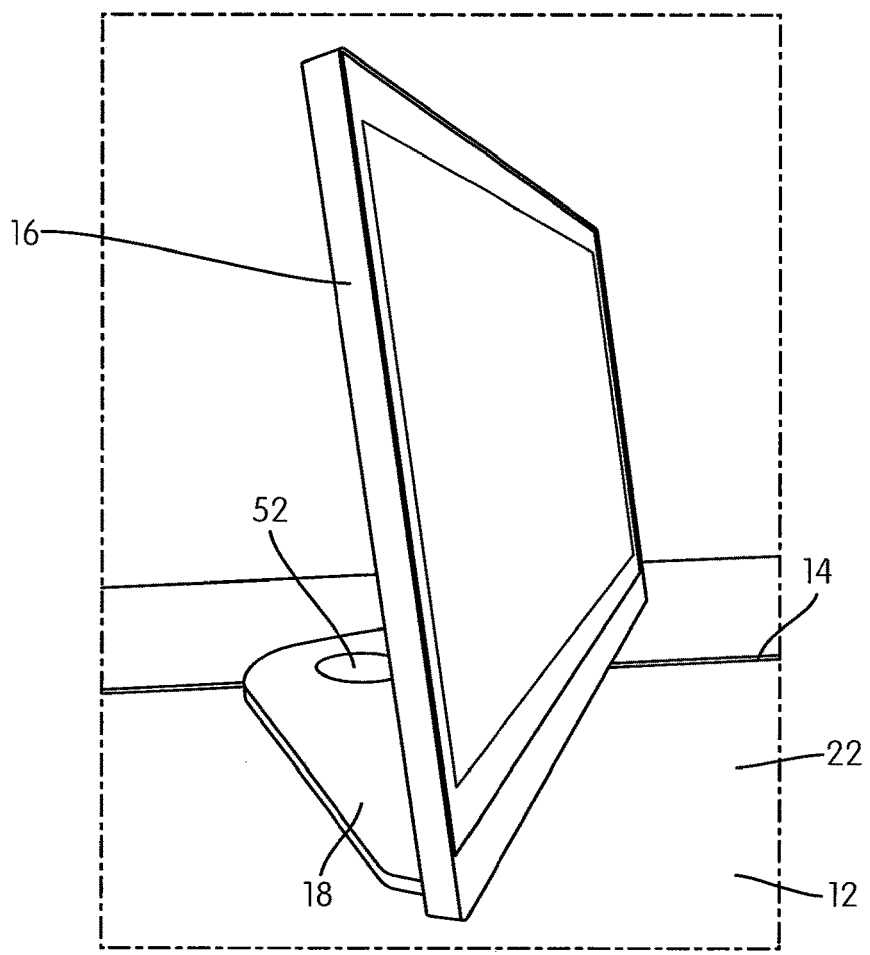
Figure 2:
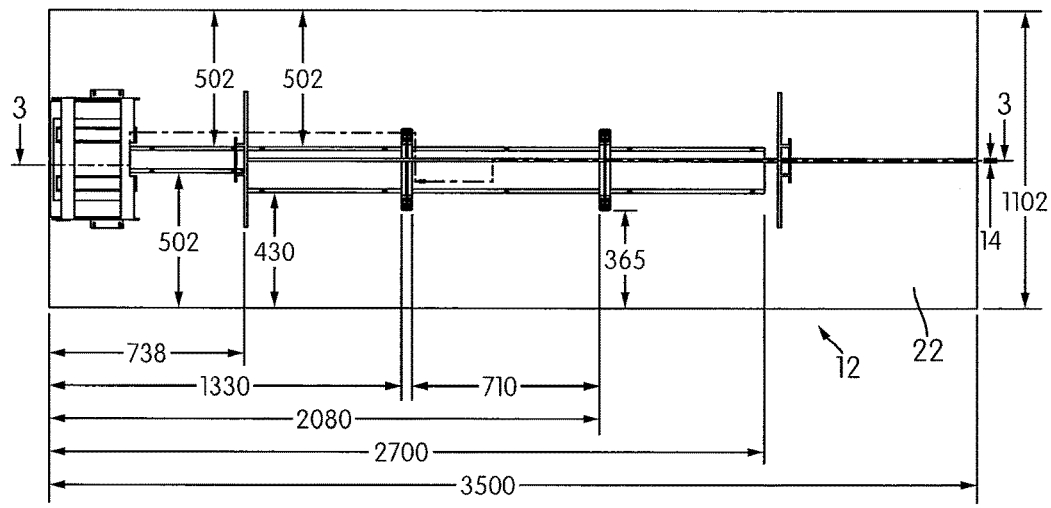
Figure 9:
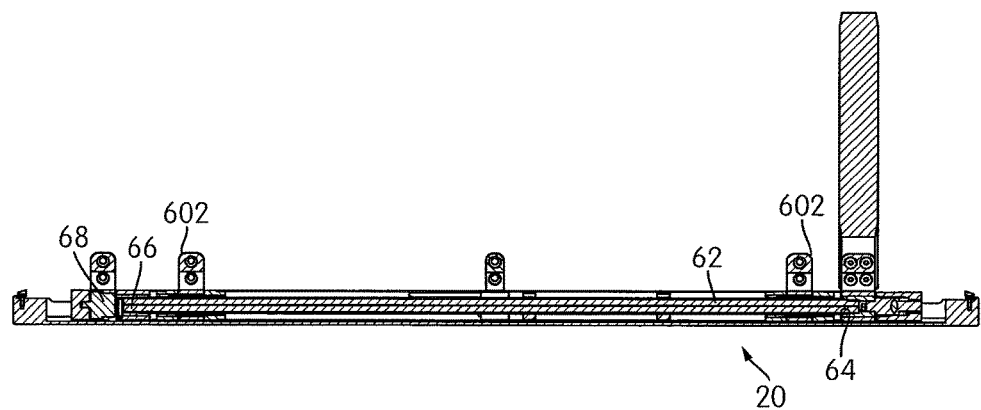
FIG. 9 shows a cross-sectional view of the display device and the orienting mechanism taken along the axis A-A of FIG. 8.
Figure 9A:
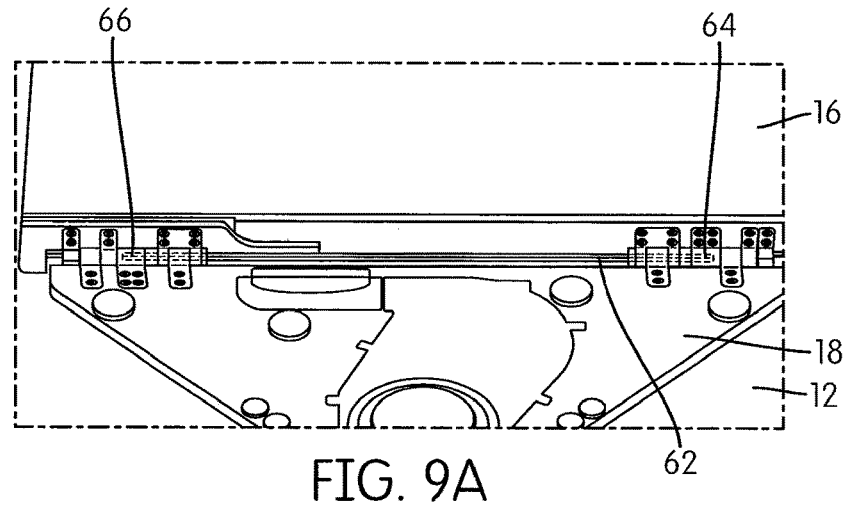
FIGS. 9A and 9B show partial perspective views of the display system in accordance with an embodiment of the present patent application, where
Figure 9B:
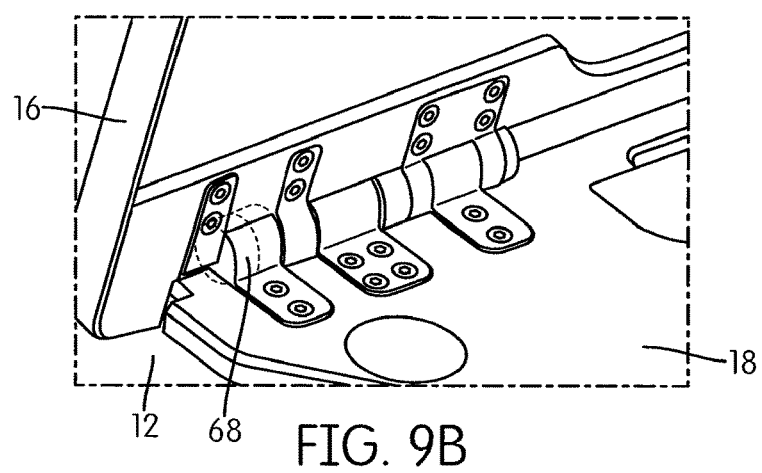
Figure 13:
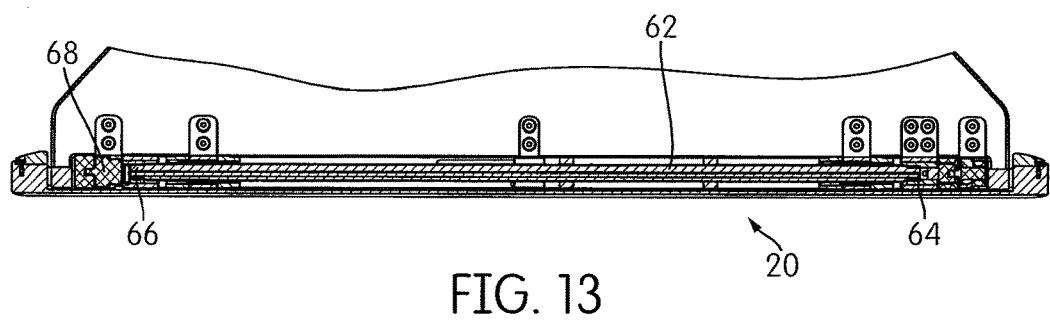
FIGS. 13 and 14 show cross-sectional views of the display system taken along the axes A-A and C-C of FIG. 12.
Figure 14:
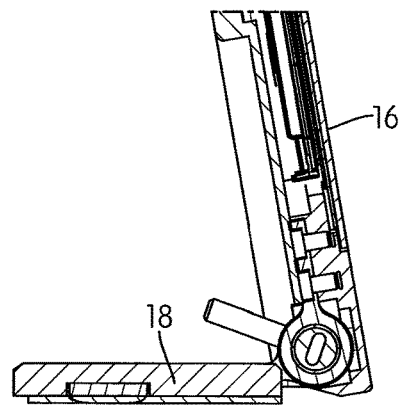
Figure 15:
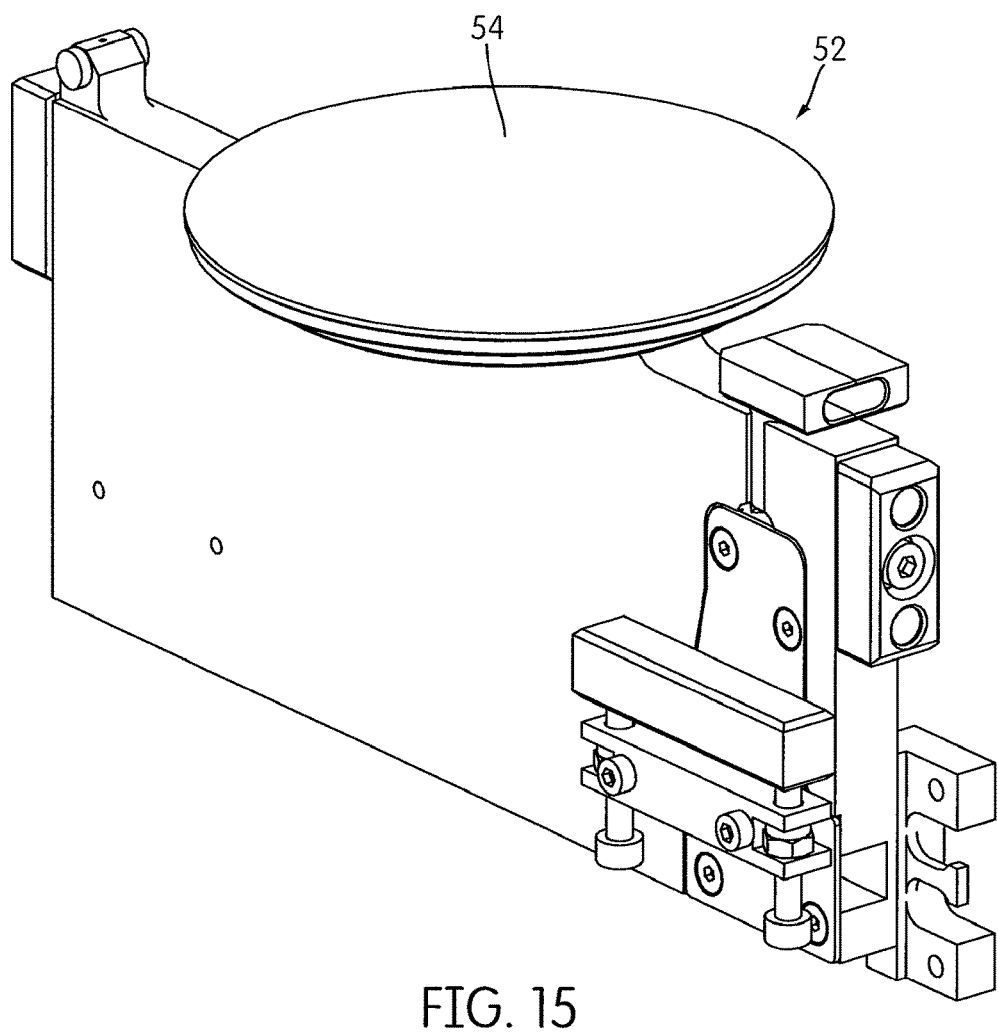
FIG. 15 shows a side perspective view of a carriage mechanism of the display system in accordance with an embodiment of the present patent application.
Figure 15A:
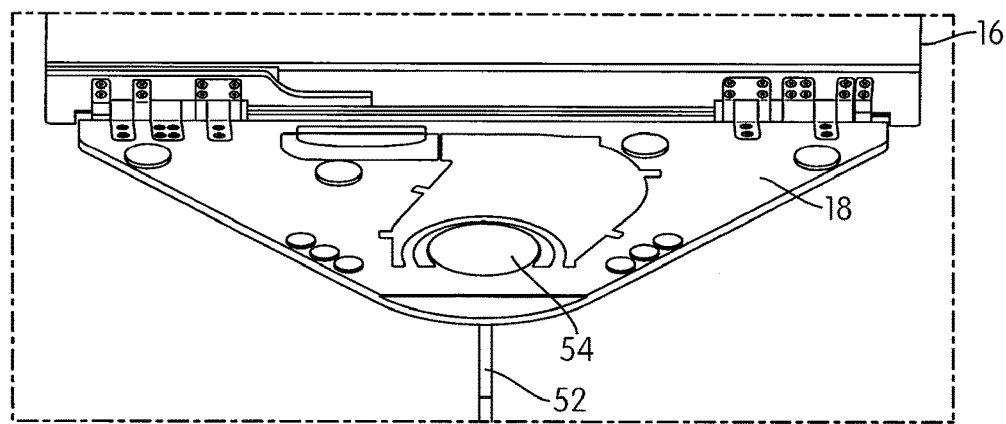
FIGS. 15A and 15B show partial perspective views of the display system with the carriage mechanism in accordance with an embodiment of the present patent application, some of the portions of the display system in FIGS. 15A and 15B are removed to better illustrate the construction of the remaining portions of the display system.
Figure 15B:
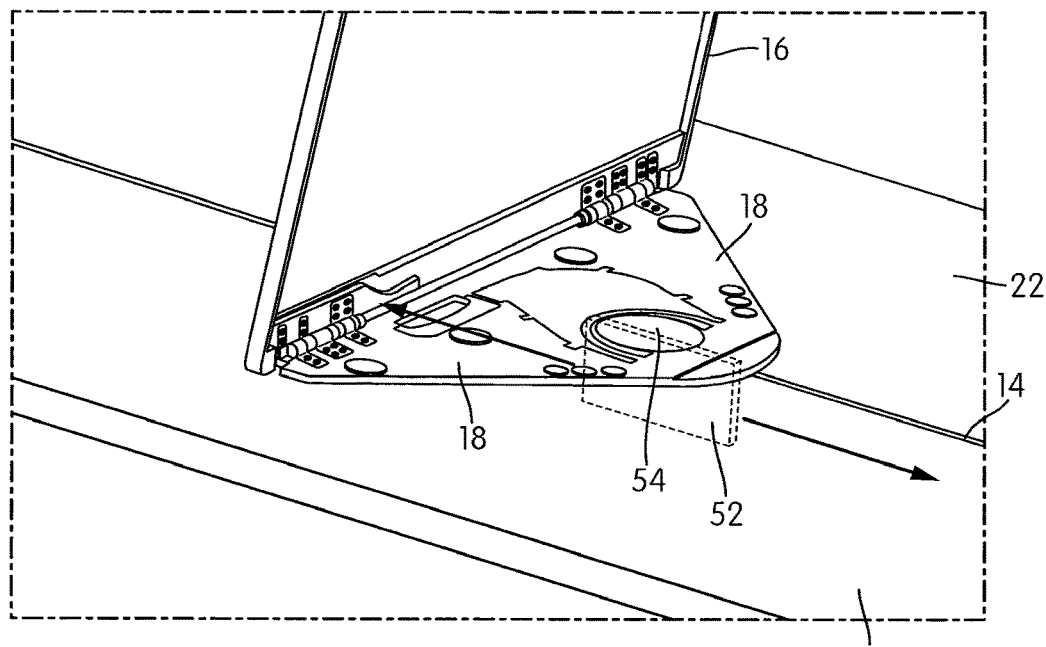
Figure 16:
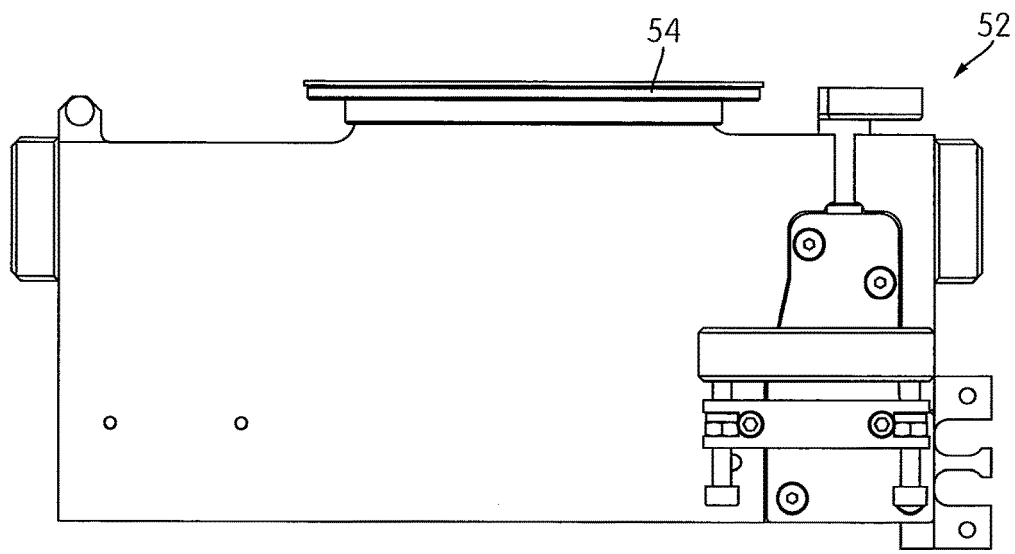
FIGS. 16-19 show a left hand side elevational view, a right hand side elevational view, a front elevational view and a top plan view of the carriage mechanism in accordance with an embodiment of the present patent application.
Figure 17:
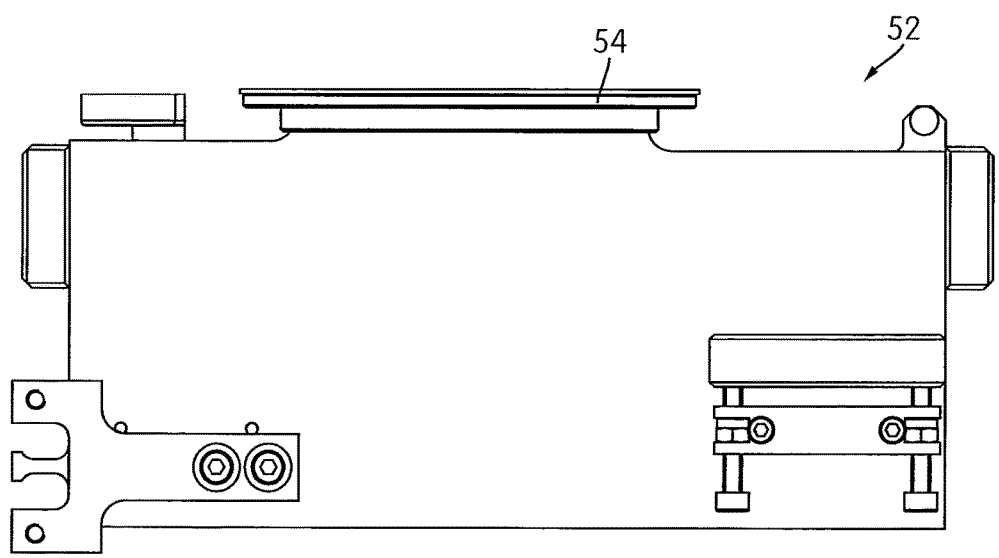
Figure 18:
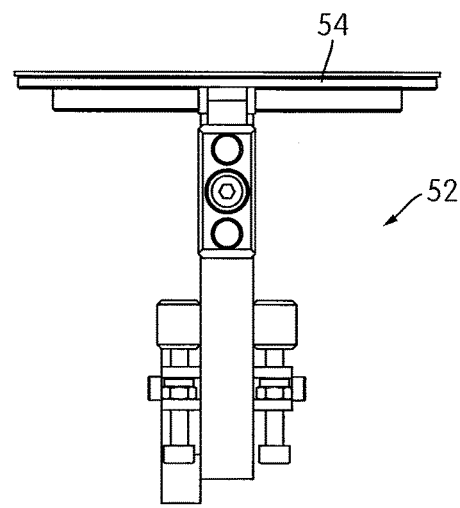
Figure 19:
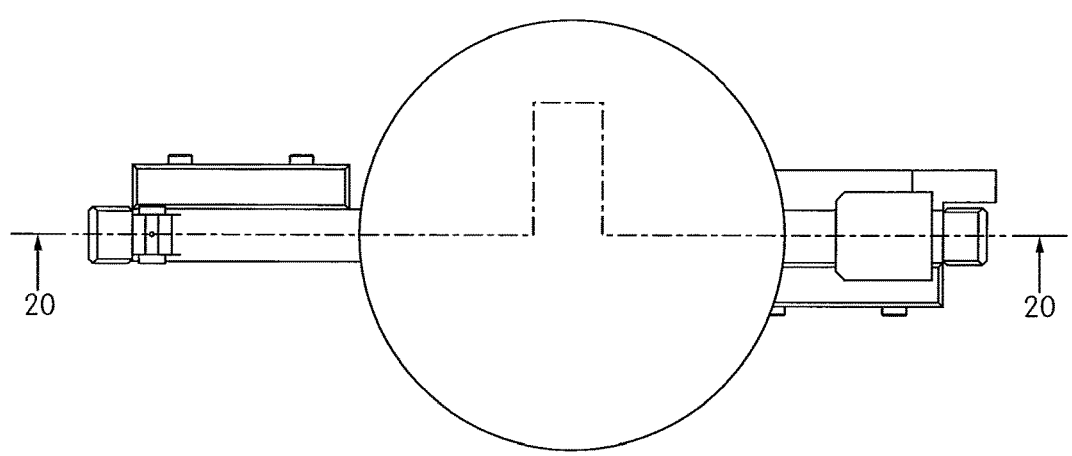
Figure 20:
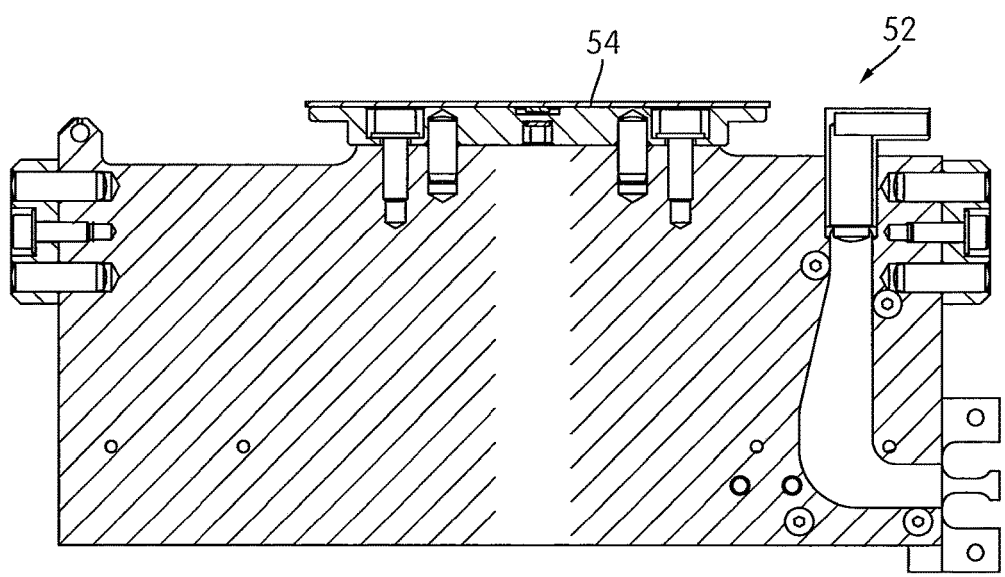
FIG. 20 shows a cross-sectional view of the carriage mechanism taken along the axis A-A of FIG. 19.

In one embodiment, the display device 16 is constructed and arranged to display visual content to a user. The mount member 18 is constructed and arranged to mount the display device 16 on the track 14 carried by the table 12. As shown in FIGS. 24-26 and 39-40, the mount member 18 is slidable on the track 14 to different locations on the track 14 to enable the display device 16 to be located at the different locations on the track 14. In one embodiment, the orienting mechanism 20 is constructed and arranged to be operatively connected to the display device 16 and the mount member 18 and to facilitate movement of the display device 16 between a first configuration (as shown in FIG. 1A) in which the display device 16 is configured to be positioned substantially parallel to a top surface 22 of the table 12, and a second configuration (as shown in FIGS. 1 and 1B) in which the display device 16 is configured to be substantially inclined with respect to the top surface 22 of the table 12. The orienting mechanism 20 includes a biasing mechanism 62 (as shown in FIGS. 9, 9A and 13) that, when actuated, moves the display device 16 from the first configuration to the second configuration.

In one embodiment, the table 12 may be a conference table or a meeting table that allows two or more users seated around the table 12 to interact with each other during presentation meetings or conferences. The table 12 generally includes a top assembly 26 with the work surface or top surface 22 and a leg assembly 24. In one embodiment, the leg assembly 24 has two or more leg support members 24A, 24B configured to support the top assembly 26. In one embodiment, the table 12 may include electrical outlets and communication connectors to provide power supply and communication connections, respectively to devices positioned on the work surface 22. In one embodiment, the electrical outlets and communication connectors may be accessible from the work surface 22. In one embodiment, the electrical outlets and communication connectors may be covered by removable cover(s). In one embodiment, the electrical outlets and communication connectors are optional.

Figure 3:
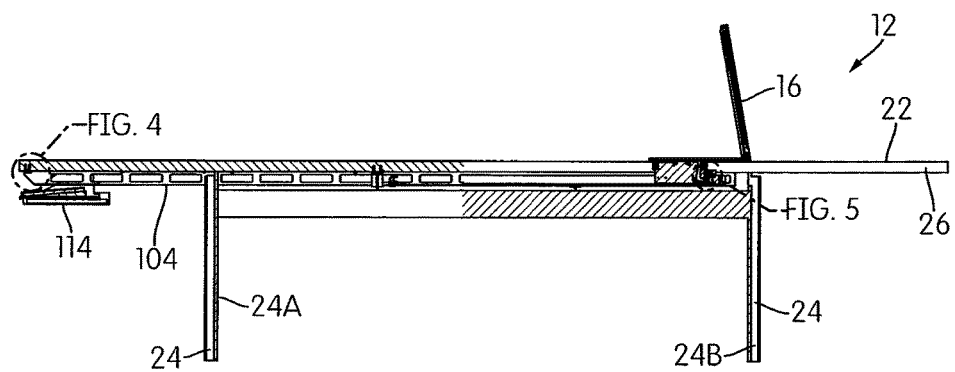
FIG. 3 shows a cross-sectional view of the display system taken along the axis A-A of FIG. 2.

In one embodiment, the table 12 may be modular and may be adjustable to different lengths to suit the needs of the users. In one embodiment, as shown in FIGS. 1 and 3, the table 12 may include a drawer or slidable member 114 that is configured to be disposed on an underside 104 of the top assembly 26 of the table 12 such that the slidable member 114 is movable between a retracted position where it is disposed underneath the top assembly 26 of the table 12 and an extended position where it extends out from underneath the top assembly 26 of the table 12. In one embodiment, the system 10 may include ball bearing slide assemblies or other slide assemblies to move the slidable member 114 between the retracted position and the extended position.

Figure 5:
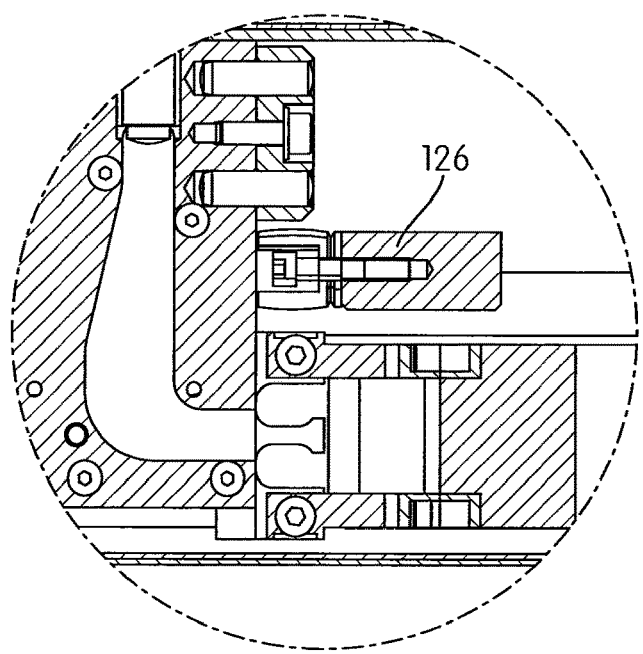
Figure 5A:
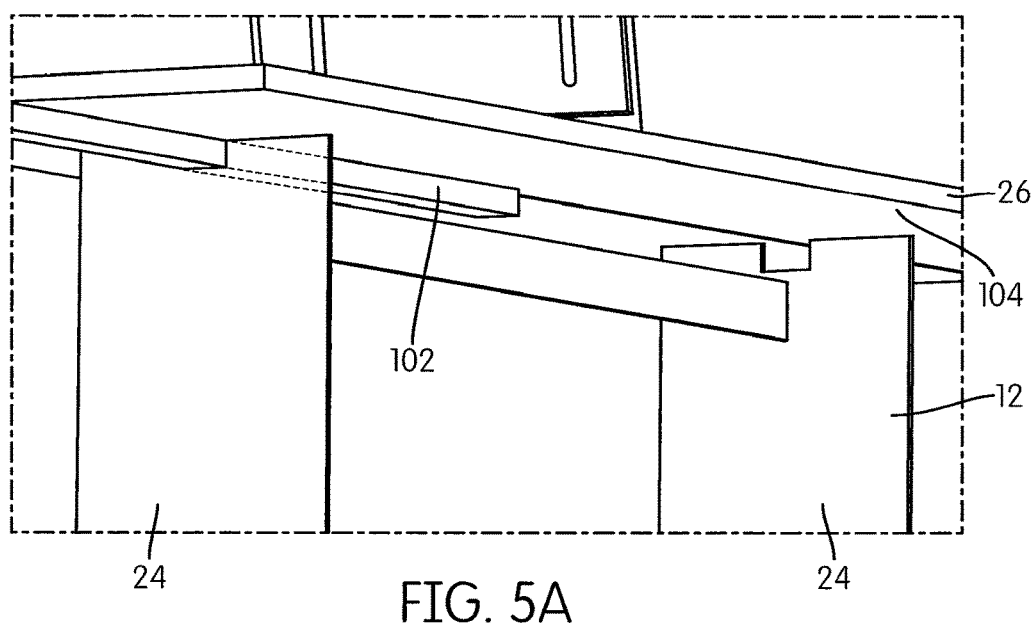
FIG. 5A shows a partial, perspective view of the display system with a cable routing housing in accordance with an embodiment of the present patent application, where some of the portions of the display system in FIG. 5A are removed to better illustrate the construction of the remaining portions of the display system.

In one embodiment, referring to FIG. 5A, the system 10 includes a cable routing housing 102. The cable routing housing 102 is disposed on the underside 104 of the top assembly 26 of the table 12. The cable routing housing 102 is configured for accommodating and organizing electrical and/or communication cables therein. In one embodiment, the cable routing housing 102 is also configured for routing/guiding electrical and/or communication cables between the display device 16 (e.g., destination) and the other additional or peripheral devices (e.g., source). In one embodiment, the electrical and/or communication cables are confined within the cable routing housing 102. Thus, the cable routing housing 102 provides a clean appearance to the system 10.

In one embodiment, as shown in FIG. 5A, the cable routing housing 102 may be in the form a three sided, rectangular or U-shaped channel (i.e., with an open top side). In one embodiment, a fourth or top side of the cable routing housing 102 is formed when the cable routing housing 102 is disposed on the underside 104 of the top assembly 26 of the table 12. That is, in one embodiment, the underside 104 of the top assembly 26 of the table 12 forms the fourth or top side of the cable routing housing 102. In one embodiment, the cable routing housing 102 may include flange members extending outwardly/inwardly and perpendicularly from the top portions of its side walls. In one embodiment, the flange members are configured to facilitate the securement of the cable routing housing 102 to other portions of the system 10, for example, the underside 104 of the top assembly 26 of the table 12 or to the portions of a carrier 52 of the system 10. In one embodiment, the cable routing housing 102 may be fixedly connected to the table 12 and does not move. In one embodiment, the cable(s) inside the cable routing housing 102 may be controlled by a flexible cable chain to keep the cable(s) together. In one embodiment, the flexible cable chain may be fixed to the carrier 52 and the cable routing housing 102, for example, next to the leg assembly 24 or 24B.

Figure 6:
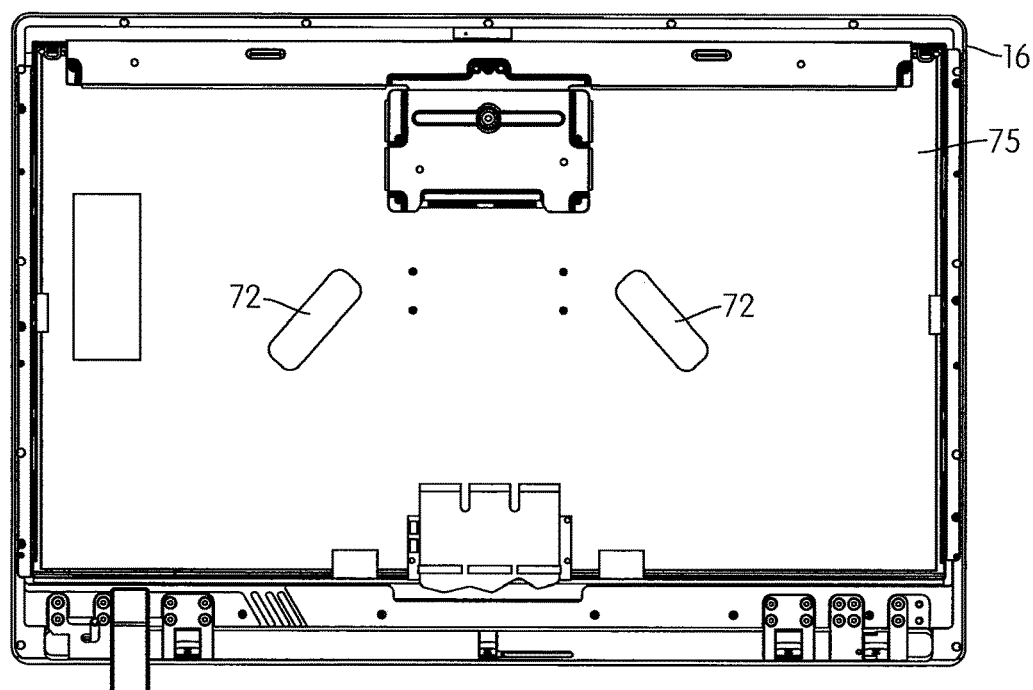
FIGS. 6 and 7 show a rear elevational view and a rear perspective view of the display device and an orienting mechanism operatively connected thereto in accordance with an embodiment of the present patent application.
Figure 7:
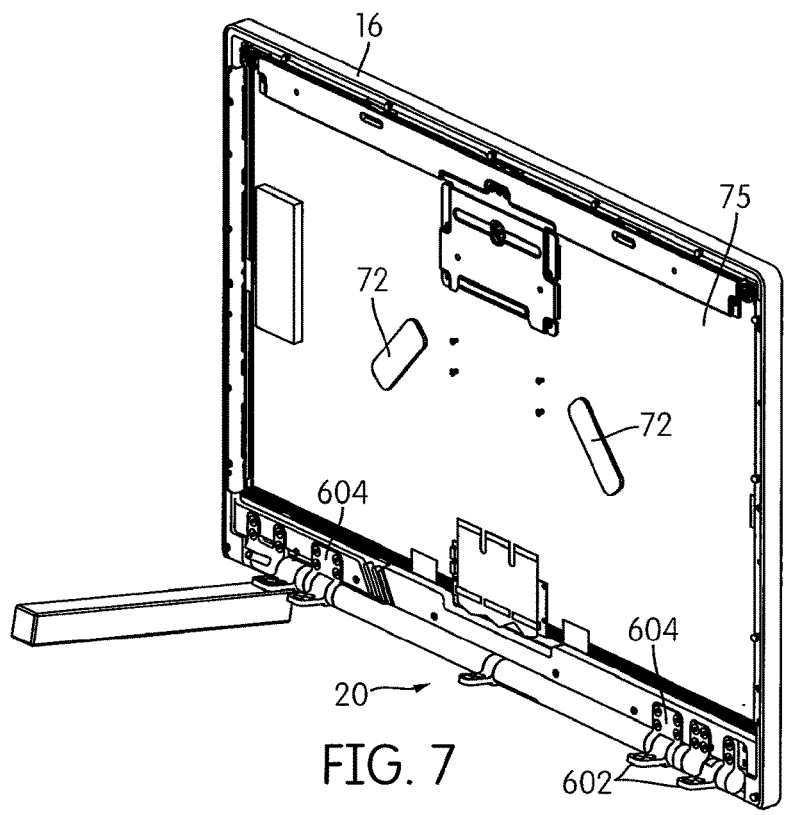
Figure 8:
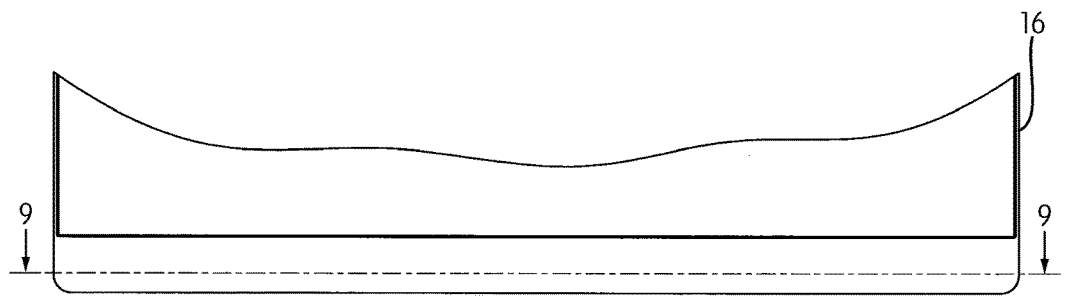
FIG. 8 shows a partial, front elevational view of the display device in accordance with an embodiment of the present patent application.

In one embodiment, referring to FIGS. 6 and 7, the display device 16 may have a glass pane (e.g., glossy) on a front side thereof. In one embodiment, the display device 16 may have black edging around the glass pane. In one embodiment, the display device 16 includes a circular aluminum frame member.

In one embodiment, the display device 16 may be a 32" display or screen. In one embodiment, the size of the display screen may vary. In one embodiment, the display device 16 may be a flat panel display. In one embodiment, the display device 16 may have a thickness of about 30 millimeters. In one embodiment, the thickness of the display screen may vary. In one embodiment, the display device 16 may have a display resolution of 2560×1440 pixels. In one embodiment, the display device 16 may have a display resolution of 2K (i.e., horizontal resolution on the order of 2,000 pixels). In one embodiment, the resolution of the display device 16 may vary.

In one embodiment, the display device 16 may be a liquid crystal display (LCD), a plasma display, an organic light emitting diode display (OLED), a light emitting diode display (LED), a field emission display (FED), etc. In one embodiment, the display device 16 may include touch screen capabilities where a user can provide input or control an information processing system of the system through touch gestures by touching the display device 16. In one embodiment, the display device 16 may be configured to switch to a power-saving mode if no input (e.g., video) signal is received.

In one embodiment, the visual information, data or content presented on the display device 16 may include any graphical, text, audio, video, data, multimedia or other digital or electronic content.

Figure 41:
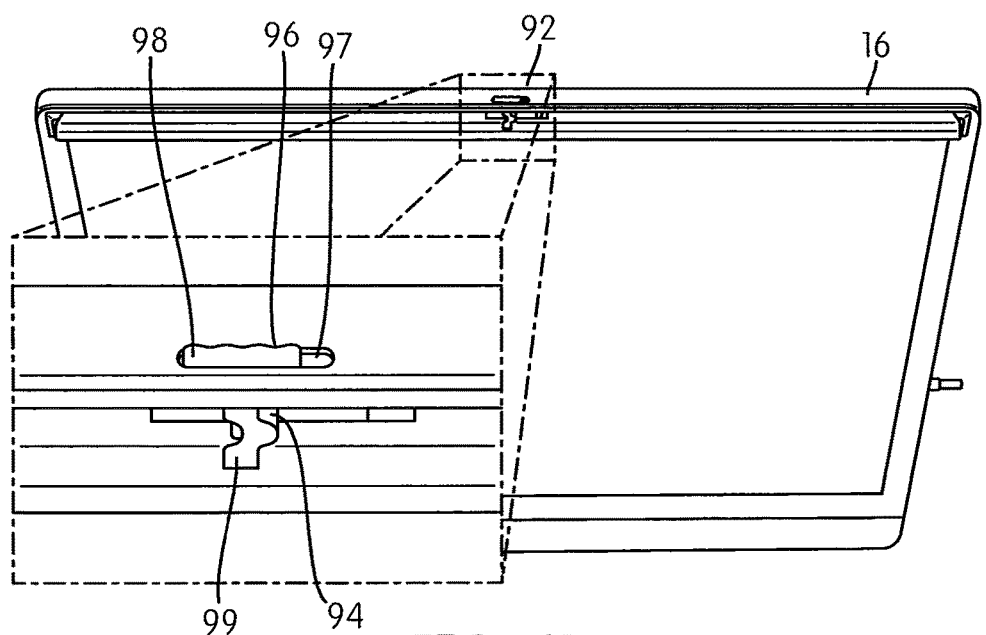
FIG. 41 shows a rear perspective view of the display device with an integrated camera and a movable cover member in accordance with an embodiment of the present patent application.

In one embodiment, as shown in FIG. 41, the display device 16 may have an integrated camera 92 positioned on a rear wall or surface 75 of the display device 16. In another embodiment, the camera may be positioned on a front wall or surface of the display device 16. The camera 92 may generally include a lens 94 to focus a stream of light to create an image and a sensor arrangement operatively coupled to the lens 94 so as to record the focused stream of light. In one embodiment, the display device 16 may include a movable cover member 96 (e.g., sliding member) that is configured to be movable between a covered configuration in which it is configured to cover the camera 92 (and lens 94) when the camera 92 is not being used and an exposed configuration in which it is configured to expose the camera 92 (and lens 94) when the camera 92 is ready to be used. Thus, the movable cover member 96 is configured to protect the privacy of the user by covering the camera 92 when the camera 92 is not being used. In one embodiment, the movable cover member 96 may include a manually engageable member 98 and a cover member 99. In one embodiment, the manually engageable member 98 is slidably mounted (e.g., in a channel 97) on the display device 16 and operatively connected with the cover member 99. In one embodiment, the manually engageable member 98 is configured to be movable or slidable to move the cover member 99 between the covered and exposed configurations. In one embodiment, the user may use the manually engageable member 98 to move the cover member 99 between the covered and exposed configurations.

In one embodiment, the display device 16 may include a tilt sensor that is configured to detect if the display device 16 is in the horizontal or vertical position. In one embodiment, the tilt sensor may be integrated into the display device 16. In one embodiment, the tilt sensor is configured to detect if the display device 16 is in the horizontal or vertical position, for example, by the connected computer system via the USB cable.

Figure 42:
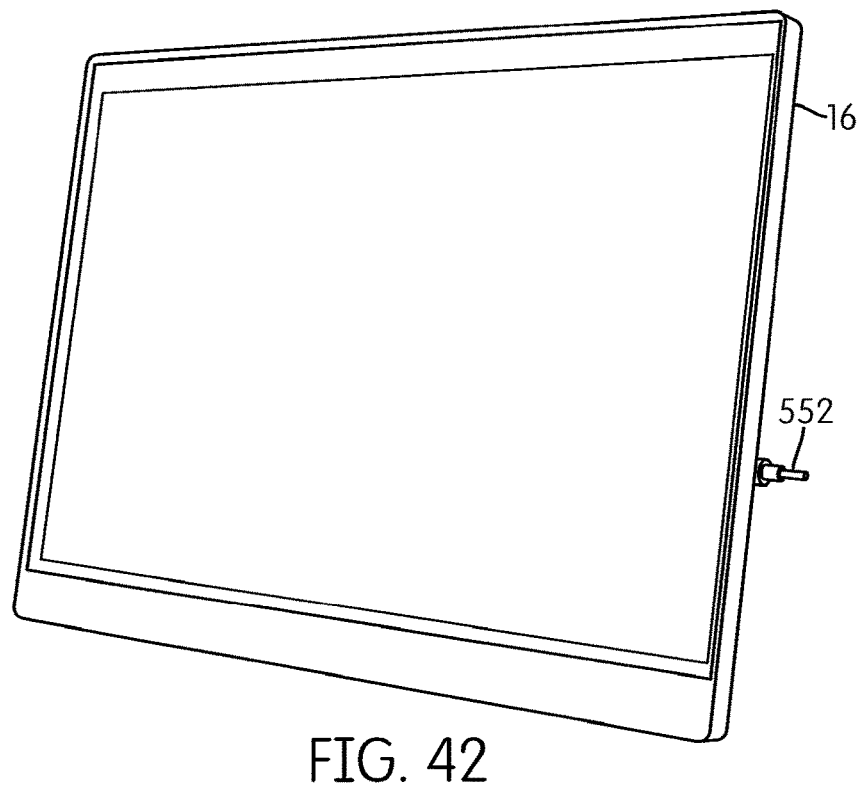
FIG. 42 shows a front perspective view of the display device with a High-Definition Multimedia Interface (HDMI) port and a High-Definition Multimedia Interface (HDMI) cable connected thereto in accordance with an embodiment of the present patent application

In one embodiment, the display device 16 may include one or more ports that serve as an interface between the display device 16 and other additional or peripheral devices. In one embodiment, the other additional or peripheral devices may include a computer system, a digital video disk (DVD) player, a storage server or other video sources. In one embodiment, the display device 16 may include a Universal Serial Bus (USB) port, a High-Definition Multimedia Interface (HDMI) port, a Video Graphics Array (VGA) port, a video cable connection port, an RF (coaxial cable) connection port, etc. In one embodiment, these connection ports may be used facilitate communication between the other additional or peripheral devices and the display device 16. In one embodiment, the display device 16 may be in communication with other additional or peripheral devices using wired or wireless signal systems (e.g., Near Field Communication (NFC), Local Area Network (LAN), Wireless Local Area Network (WLAN), Bluetooth, RF, Wi-Fi etc.). In one embodiment, as shown in FIG. 42, the display device 16 includes a High-Definition Multimedia Interface (HDMI) port and a High-Definition Multimedia Interface (HDMI) cable 552 connected thereto. In one embodiment, in addition to the HDMI port and the USB port, the display device 16 may include a port that is configured to allow the display device 16 to be connected to a computer device. For example, the display device 16 may include a Display Port (DP) that is configured to allow the display device 16 to be connected to a computer device.

Figure 9C:
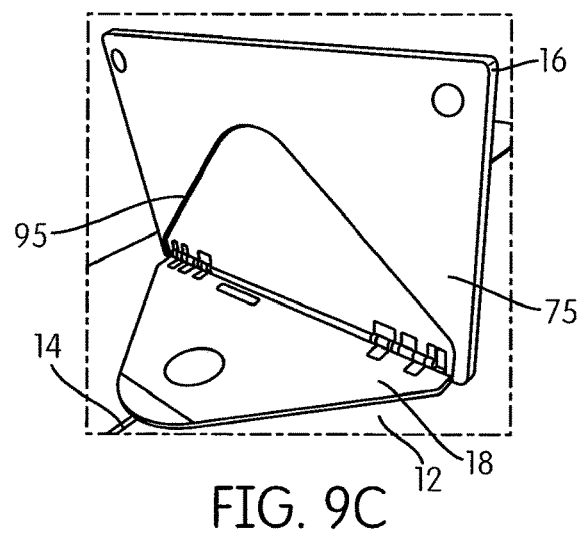
FIG. 9C shows a rear perspective view of the system in accordance with an embodiment of the present patent application.

In one embodiment, as shown in FIG. 9C, the rear wall or surface 75 of the display device may include a complementary shaped groove or notch 95 that is configured to receive the mount member 18 therein when the display device 16 is in its first configuration.

Figure 10:
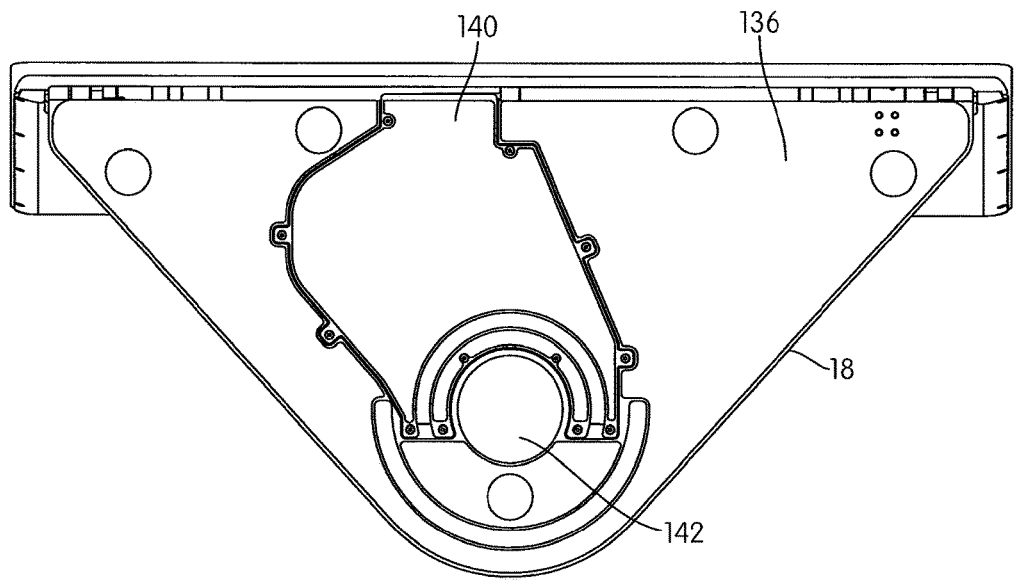
FIGS. 10 and 11 show bottom plan views of a mount member of the display system in accordance with an embodiment of the present patent application.
Figure 10A:
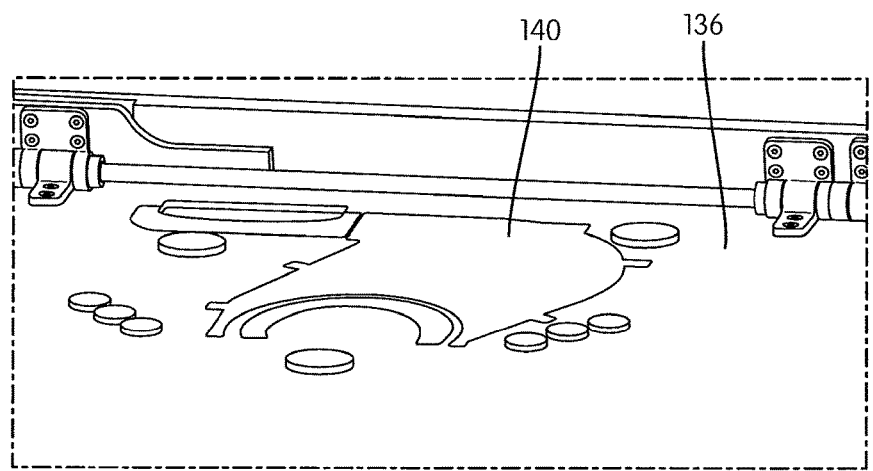
FIGS. 10A and 10B show partial perspective views of the display system in accordance with an embodiment of the present patent application, some of the portions of the display system in FIGS. 10A and 10B are removed to better illustrate the construction of the remaining portions of the display system.
Figure 10B:
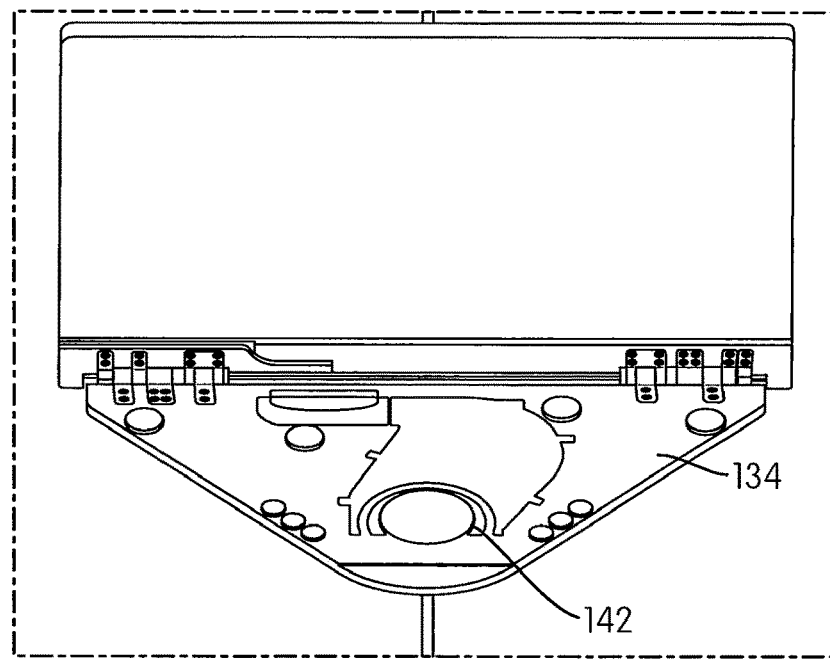
Figure 11:
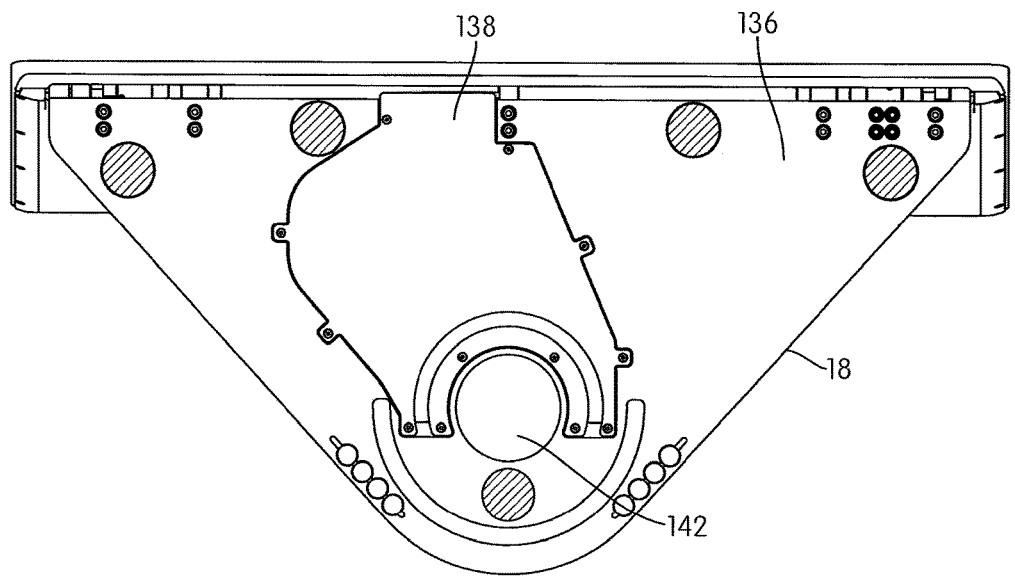
Figure 12:
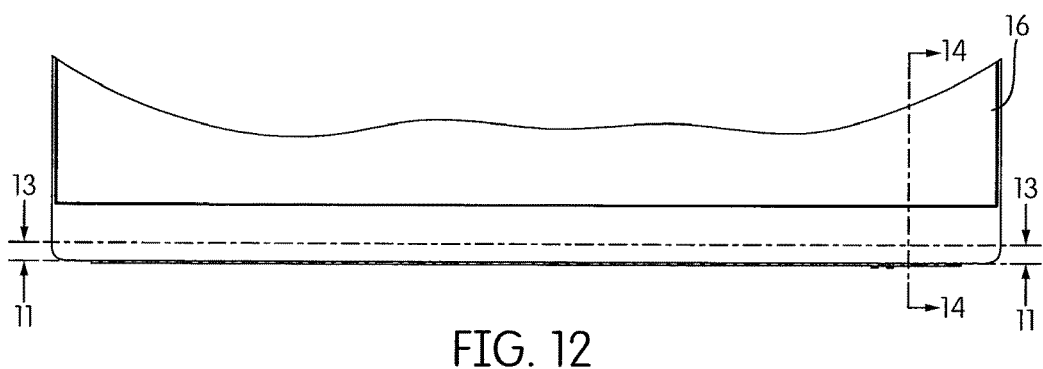
FIG. 12 shows a partial, front elevational view of the display device in accordance with an embodiment of the present patent application.

In one embodiment, referring to FIGS. 10 and 11, the mount member 18 may have triangular shaped configuration. In one embodiment, the mount member 18 may have other shaped configurations. In one embodiment, the mount member 18 may be formed from an aluminum material. In one embodiment, the mount member 18 may be formed from other metal materials or composite materials. In one embodiment, the mount member 18 is configured to serve as a foundation plate of the display system 10. In one embodiment, the mount member 18 may be referred to as a gliding member of the display system 10.

In one embodiment, referring to FIGS. 10, 10A, 10B and 11, the mount member 18 may include a top member 134, a bottom member 136 and a cover member 138. In one embodiment, the top member 134 and the bottom member 136 are assembled with each other to form the mount member 18. In one embodiment, the bottom member 136 includes a channel 140 that is configured to receive and accommodate electrical and/or communication cables therein. In one embodiment, the cover member 138 is configured to cover the channel 140, of the bottom member 136, with the electrical and/or communication cables received therein.

In one embodiment, the mount member 18 may include Teflon or Polytetrafluoroethylene (PTFE) material strip(s) to support its sliding on the top surface 22 (e.g., wood surface) of the table 12. That is, in one embodiment, the mount member 18 is coated on its underside or bottom surface of the bottom member 136 with a Teflon or Polytetrafluoroethylene (PTFE) material. Teflon or Polytetrafluoroethylene (PTFE) material generally has a low coefficient of friction and high self-lubricating characteristics. In one embodiment, the Teflon coated underside of the mount member 18 facilitates sliding of the mount member 18 between different locations on the surface 22 of the table 12.

In one embodiment, the mount member 18 may include an opening 142 configured to receive a complementary portion 54 of the carrier 52 (as shown in FIGS. 15-20) therein. In the illustrated embodiment, the opening 142 of the mount member 18 and the complementary portion 54 of the carrier 52 have circular shaped configurations. In other embodiments, the opening 142 of the mount member 18 and the complementary portion 54 of the carrier 52 may have other shaped configurations.

In one embodiment, the guide rail, track 14 or the like is carried by the table 12 for guiding the carrier 52. In one embodiment, the track 14 is centrally disposed on the table 12 and extends parallel to a longitudinal axis of the table 12.

In one embodiment, the portion 54 of the carrier 52 is received in the opening 142 of the mount member 18 such that the mount member 18 is generally mounted on the carrier 52. The carrier 52 is slidably received within or on the track 14 to slidably move the mount member 18 and the display device 16 mounted thereon on the track 14.

In one embodiment, the track 14 is constructed and arranged for guiding the carrier 52 for linear movement that enables slidable movement of the mount member 18 and the display device 16 mounted thereon on the track 14 to different locations on the track 14 to enable the display device 16 to be located at the different locations on the track 14. The carrier 52 may be sliding or rolling mounted in the or on track 14 to facilitate such movement. In one embodiment, rollers or bearing wheels may be constructed and arranged to permit the carrier 52 to slide generally linearly along the track 14.

In one embodiment, the carrier 52 may be linearly driven along the track 14 by a drive mechanism such as an electromagnetic, pneumatic, hydraulic or any other suitable motor or other type of drive mechanism. For example, in one embodiment, the drive mechanism may generally comprise an electromechanical motor mounted in or on the table 12 such that the motor cooperates with a cable, belt, chain, screw-drive or other such mechanism to slide the mount member 18 along the track 14. In one embodiment, the drive mechanism is optional.

In one embodiment, the carrier 52 has a single center of rotation that is configured allow 90 degree rotation of the mount member 14 and the display device 16 mounted thereon to the left and right positions. That is, the single center of rotation of the carrier 52 is configured to allow for a 90 degree left side rotation or a 90 degree right side rotation of the mount member 18 and the display device 16 mounted thereon.

Figure 4:
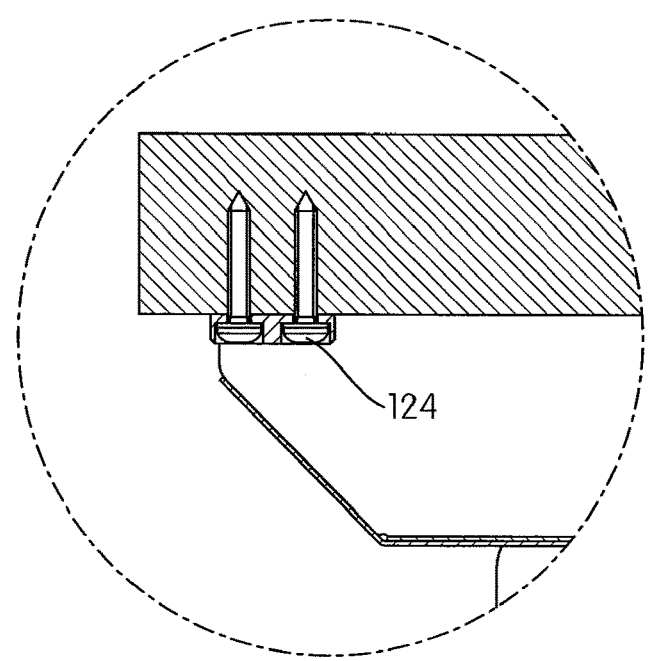
FIGS. 4 and 5 show detail views of portions B and C of FIG. 3, where

In one embodiment, as shown in FIGS. 4 and 5, the system 10 may include stop members 124 and 126 positioned at the end portions of the track 14. In one embodiment, portions of the stop member 124 are configured to engage with portions of the carrier 52 so as to arrest or stop the sliding movement of the carrier 52 at one end portion of the track 14 and portions of the stop member 126 are configured to engage with portions of the carrier 52 so as to arrest or stop the sliding movement of the carrier 52 at the other end portion of the track 14. In one embodiment, the stop members 124 and 126 are also configured to serve as a shock absorber to absorb the impact between the carrier 52 and the stop members 124 and 126. In one embodiment, the stop members 124 and 126 are configured to prevent the carrier 52 from exiting the track 14.

Figure 10C:
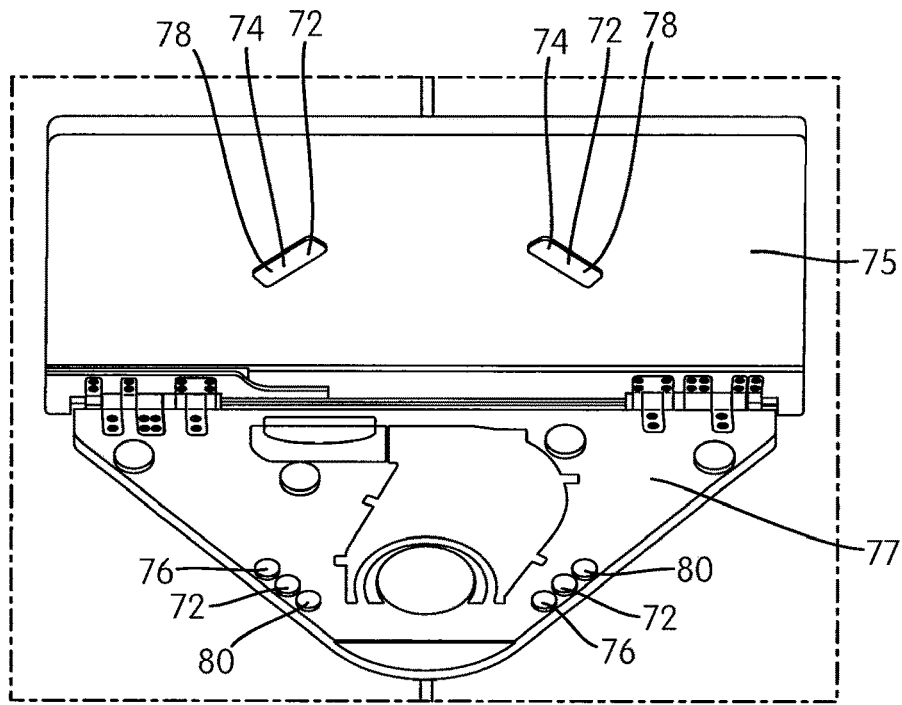
FIG. 10C shows a perspective view of the display system showing a latch arrangement configured to secure the display device to the mount member when the display device is in its first configuration in accordance with an embodiment of the present patent application, some of the portions of the display system in FIG. 10C are removed to better illustrate the construction of the remaining portions of the display system.

In one embodiment, referring to FIG. 10C, the system 10 includes a lock arrangement 72 that is constructed and arranged to releasably lock the display device 16 with respect to the mount member 18 so as to prevent pivotal movement of the display device 16 away from its first configuration. The lock arrangement 72 may be of numerous different types of configurations as will be appreciated by those skilled in the art when considering this disclosure. For example, in one embodiment, referring to FIG. 10C, the lock arrangement 72 may be a magnetic lock arrangement that is configured to use magnetic attraction of magnets to releasably lock the display device 16 and the mount member 18 when the display device 16 is in its first configuration.

In one embodiment, the lock arrangement 72 may include magnet member(s) 74 constructed and arranged to be mounted to one of the display device 16 and the mount member 18 and ferromagnetic member(s) 76 (e.g., made from an iron, or other ferromagnetic materials) constructed and arranged to be mounted to the other of the display device 16 and the mount member 18. In another embodiment, the lock arrangement 72 may include two magnet members 78 and 80. The magnet members 78 and 80 are configured to be mounted to the display device 16 and the mount member 18, respectively. In one embodiment, the magnet members 78 and 80 are polarized oppositely such that they attract each other to provide a releasable lock connection between the display device 16 and the mount member 18, when the display device 16 is in its first configuration.

In the illustrated embodiment of FIG. 10C, an elongated magnet member or ferromagnetic member is mounted on the rear surface 75 of the display device 16 and three individual circular magnet members or ferromagnetic members are mounted on a top surface 77 of the mount member 18. However, it is contemplated that the number, strength, shape and size of the magnets and/or ferromagnetic members may vary in other embodiments.

In one embodiment, the lock arrangement 72 is configured to be moved from the lock configuration to the release configuration when a force slightly greater than the inherent magnetic attraction or force of the magnet members 78, 80 and/or the magnet member and ferromagnetic member 74, 76 is applied on the display device 16 by the user. That is, in order to unlock/release the display device 16 from the mount member 18, a user may apply sufficient force to overcome the locking force of the releasable lock 72. The arrangement of the magnets and/or ferromagnetic members in the system 10 are such that when the display device 16 is moved to the first configuration and when the display device 16 comes close to the mount member 18, the lock arrangement 72 releasably locks the display device 16 and the mount member 18 and prevents pivotal movement of the display device 16 away from its first configuration.

In one embodiment, as shown in FIGS. 7 and 9, the orienting mechanism 20 may include a first hinge member 602 constructed and arranged to be mounted to one of the display device 16 and the mount member 18, a second hinge member 604 constructed and arranged to be mounted to the other of the display device 16 and the mount member 18 and a hinge shaft constructed and arranged to pivotally connect the first hinge member 602 to the second hinge member 604. In one embodiment, the system 10 may have one or more first hinge members 602 and one or more second hinge members 604.

In one embodiment, for example, the hinge shaft may be in the form of an elongated torque rod, torsion spring member or torsion bar 62. In one embodiment, the biasing mechanism of the orienting mechanism 20 includes the elongated torque rod 62. In one embodiment, the biasing mechanism of the orienting mechanism 20 includes a pre-loaded torsion spring. In one embodiment, the elongated torque rod 62 may have a square shaped cross-sectional configuration. In one embodiment, the elongated torque rod 62 may have a circular shaped cross-sectional configuration, a hexagonal shaped cross-sectional configuration or other polygonal shaped cross-sectional configurations as would be appreciated by one skilled in the art. In one embodiment, the elongated torque rod 62 may be made from a steel, other metal materials, or a composite material.

In one embodiment, referring to FIGS. 9, 9A, and 13, the orienting mechanism 20 includes the elongated torque rod 62 having a first end 64 and a second end 66. In one embodiment, the first end 64 of the torque rod 62 may be shaped and constructed to be mated with a complementary shaped opening of the mount member 18 such that insertion of the torque rod 62 into that opening rotationally locks the torque rod 62 to the mount member 18. In one embodiment, the complementary shaped opening may be disposed on the hinge member mounted to the mount member 18. In one embodiment, the second end 66 of the torque rod 62 may be shaped and constructed to be mated with a complementary shaped portion of the display device 16. In one embodiment, the portion of the display device 16 is constructed and arranged to lock the second end 66 of the torque rod 62 against rotation. In one embodiment, the complementary shaped portion may be disposed on the hinge member mounted to the display device 16.

As a result of this arrangement, when the display device 16 is connected to the mount member 14, one end of the torque rod 64 is locked to the portion of the mount member 14 and the other end of the torque rod 66 is locked to the portion of the display device 16. As the display device 16 is moved from its second configuration, the torque rod 62 will be subject to a torsional deflection (i.e., the rod 62 is twisted), and hence stores energy as a spring. In one embodiment, the torsional deflection is configured to resist movement of the display device 16 from its second configuration, and hence effectively absorbs some of the weight of the display device 16 as the display device 16 is being moved from its second configuration to its first configuration. Likewise, as the display device 16 is raised from its first configuration, the energy stored as torsional deflection of the torque rod 62 is configured to assist the display device 16 in being moved from its first configuration to its second configuration. This provides assistance to the user in moving the display device 16 between the first and second configurations. In one embodiment, instead of the torque rod spring discussed above, other spring storage devices such as extension springs, compression springs, torsion springs, etc. may be used in the system 10 to provide the same functions to the display device 12.

In one embodiment, referring to FIGS. 9, 9A, and 13, the orienting mechanism 20 may include damper(s) 68 that are constructed and arranged to provide rotational resistance on the hinge shaft or the torque rod 62 so that the display device 16 is not suddenly moved to the first or second configurations. That is, the damper(s) 68 or dampening mechanism is constructed and arranged to allow for a slow/soft and final movement of the display device 16 to the first or second configurations. In one embodiment, the damper(s) 68 may be pneumatic dampers, hydraulic dampers, viscous dampers, rotary dampers, etc. In one embodiment, the damper(s) 68 are configured to provide velocity control to control the display device 16 bounce back from the first configuration. In one embodiment, the damper(s) 68 are also configured to readily absorb the energy of the display device 16 moving from the first configuration to the second configuration, and thus reduces or eliminates display device 16 bounce back from the first configuration. The damper(s) 68 thus provide energy absorption and velocity control to counter the mechanical bounce back of the display device 16 from its first configuration. In one embodiment, the fluid in the damper is configured to control the velocity of the display device 16. In one embodiment, the damper 68 may have a first member constructed and arranged to fixedly connect the damper 68 to one of the display device 16 and the mount member 18 and a second member connected to the hinge shaft or the torque rod 62 such that rotation of the display device 16 causes relative motion between the first and the second members of the damper 68 to provide a resistance for controlling the velocity of the display device 16.

In one embodiment, the display device 16 may be configured to be selectively positioned into a variety of viewing configurations or positions. These different viewing configurations or positions are configured to enable a user to effectively view the visual content from a plurality of viewing angles and/or positions around the table 12.

In one embodiment, when the system 10 (including the mount member 18 and the display device 16) is slid to a certain location on the table, the mount member 18 and the display device 16 are configured to remain in that location by virtue of their own weight (i.e., until an external force is applied to the display device 16 by the user). In one embodiment, the user may simply push the system 10 on the table 12 to slide the system 10 from that location to any other location on the table 12. In one embodiment, the Teflon coating on the underside of the mount member 18 facilitates sliding of the mount member 18 between different locations on the surface 22 of the table 12. In another embodiment, when the system 10 (including the mount member 18 and the display device 16) is slid to a certain position on the table, the system 10 may be configured to be locked at that location using any lock arrangement as would be appreciated by those skilled in the art.

Figure 21:
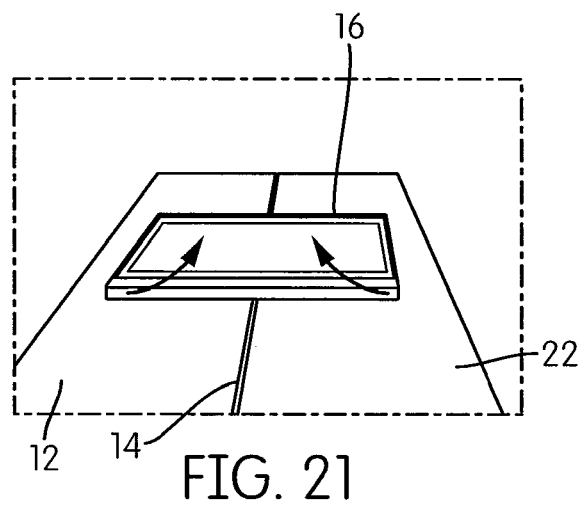
FIGS. 21-23 show the movement of the display device between a first configuration in which the display device is configured to be positioned substantially parallel to a top surface of a table and a second configuration in which the display device is configured to be substantially inclined with respect to the top surface of the table in accordance with an embodiment of the present patent application.

In one embodiment, as shown in FIG. 21, the display device 16 may be releasably locked in the first configuration in which the display device 16 is configured to be positioned substantially parallel to the top surface 22 of the table 12. In one embodiment, the display device 16 may be referred to be in a horizontal position, when positioned in the first configuration. In one embodiment, the system 10 is configured to enable an automated raising of the display device 12 from its first configuration to its second configuration.

Figure 22:
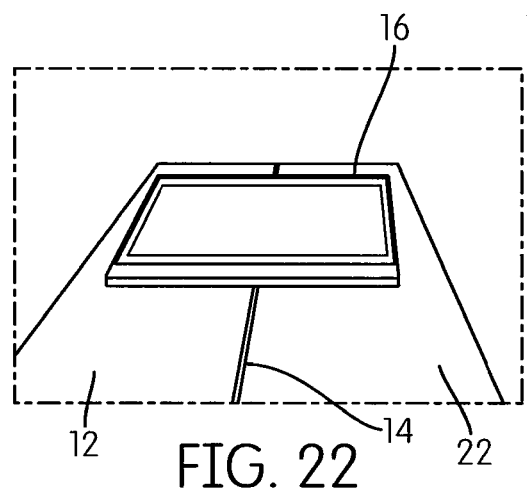

In one embodiment, as shown in FIG. 22, when a force slightly greater than a magnetic attraction or force of the magnet members 78, 80 and/or the magnet member and ferromagnetic member 74, 76 is applied on the display device 16 by the user, the lock arrangement 72 is configured to be moved from the lock configuration to the release configuration. Once the lock arrangement 72 is moved to the release configuration, the display device 16 may be moved from the first to the second configuration. As the display device 16 is moved from its first configuration to its second configuration, the energy stored as torsional deflection of the torque rod 62 is configured to assist the display device 16 in being moved from its first configuration to its second configuration. The damper(s) 68 are configured to provide energy absorption and velocity control to counter the mechanical bounce back of the display device 16 from its first configuration.

Figure 23:
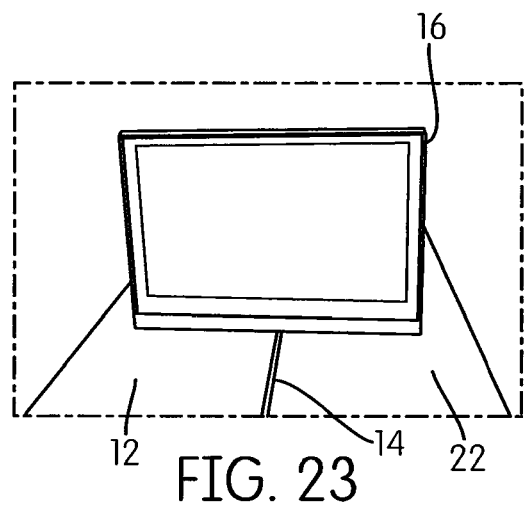

In one embodiment, as shown in FIG. 23, the display device 16 may be positioned in the first configuration in which the display device 16 is configured to be positioned substantially inclined with respect to the top surface 22 of the table 12. In one embodiment, the display device 16 may be referred to be in a vertical position, when positioned in the first configuration.

In one embodiment, the orienting mechanism 20 of the system 10 is configured to raise the display device 16 from the first configuration to the second configuration with the biasing mechanism or torsion bar 62 generating the moment of force/torque and with the damper(s) 68 absorbing the movement.

Figure 24:
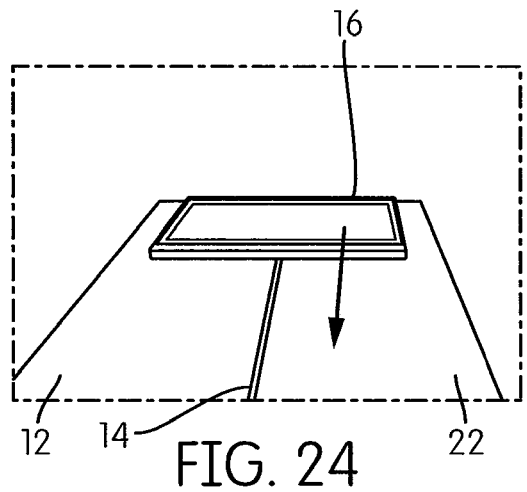
FIGS. 24-26 show the mount member being slidable on a track, carried by a table, to different locations on the track to enable the display device, when in its first configuration, to be located at the different locations on the track in accordance with an embodiment of the present patent application.
Figure 25:
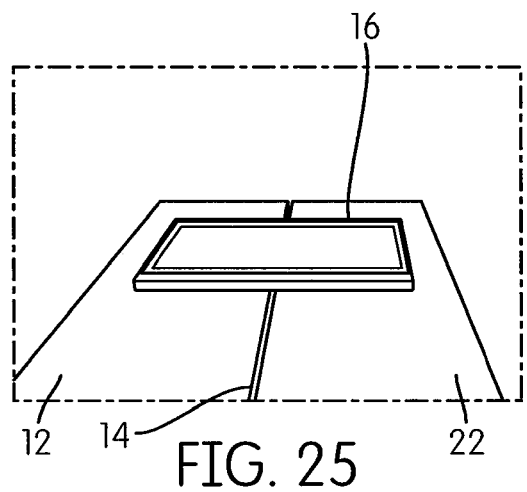
Figure 26:
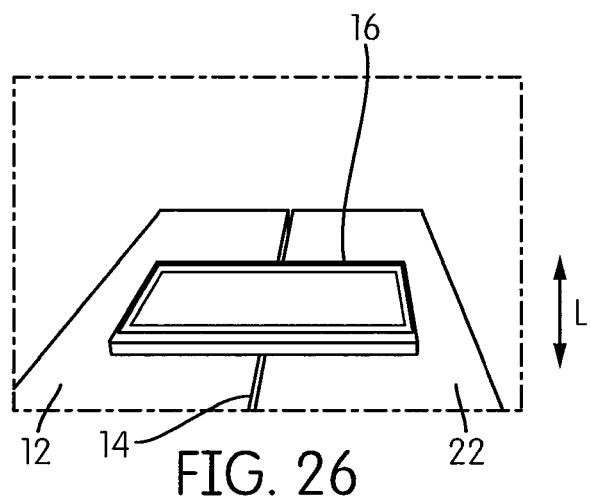
Figure 27:
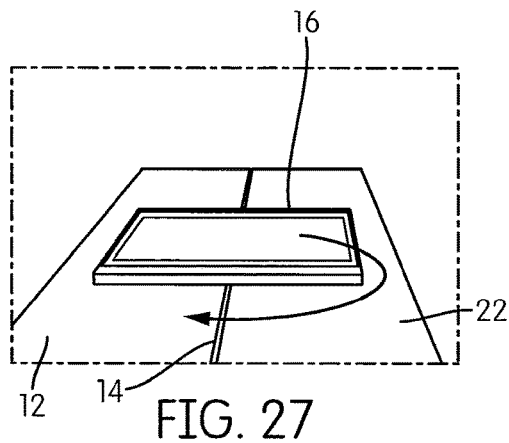
FIGS. 27-29 show the display device, when in its first configuration, being rotated in a clockwise direction in accordance with an embodiment of the present patent application.
Figure 30:
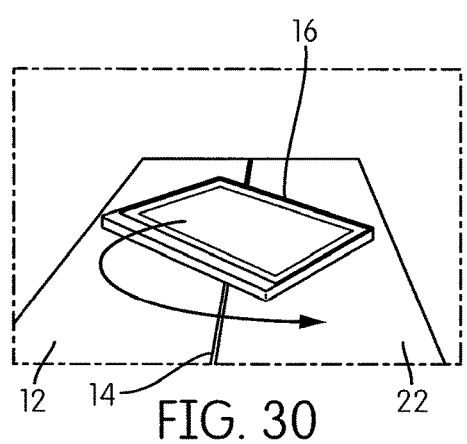
FIGS. 30-32 show the display device, when in its first configuration, being rotated in a counter clockwise direction in accordance with an embodiment of the present patent application.
Figure 28:
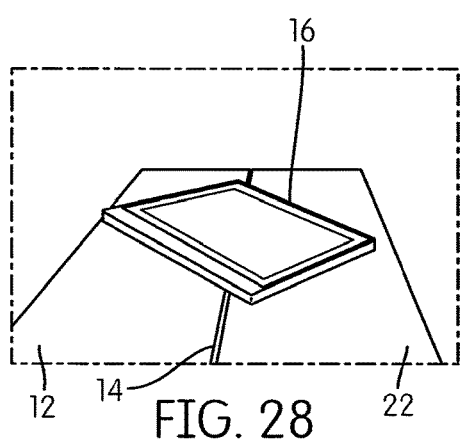
Figure 31:
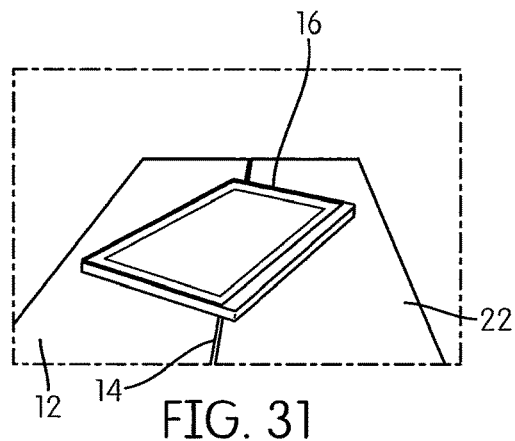
Figure 29:
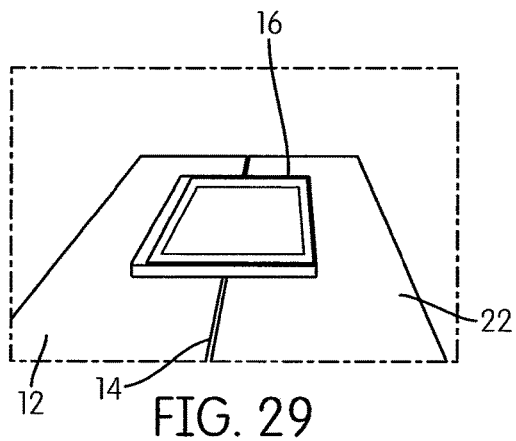
Figure 32:
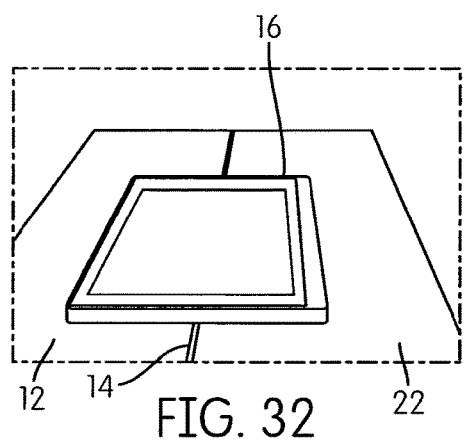
Figure 33:
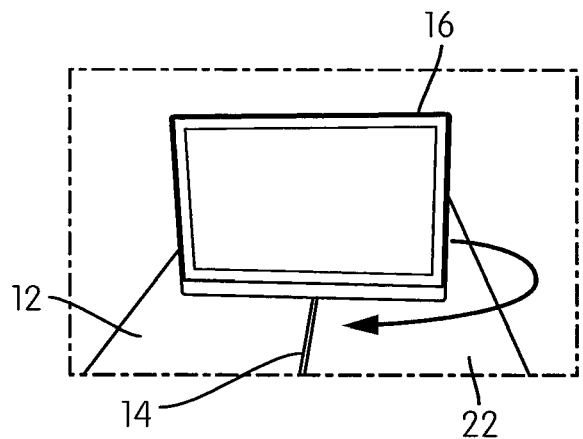
FIGS. 33-35 show the display device, when in its second configuration, being rotated in a clockwise direction in accordance with an embodiment of the present patent application.
Figure 34:
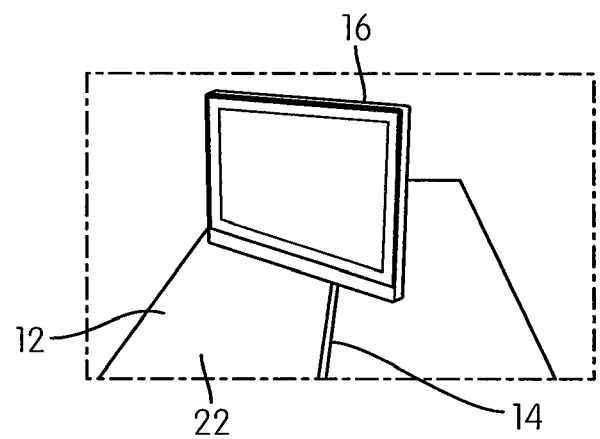
Figure 35:
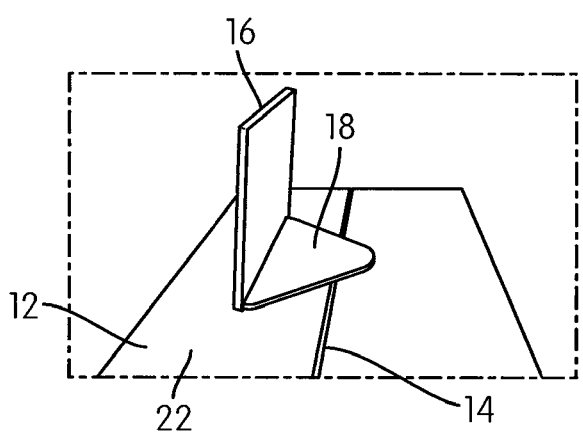
Figure 36:
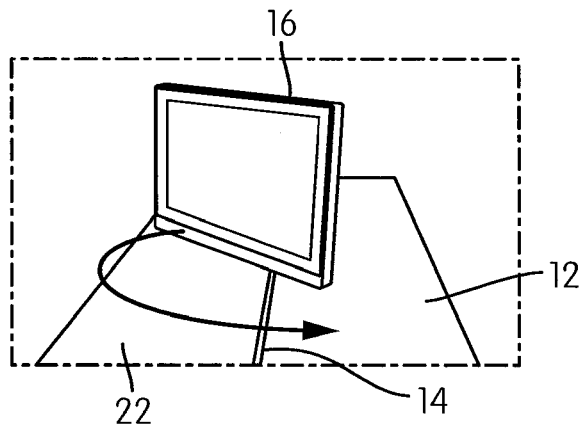
FIGS. 36-38 show the display device, when in its second configuration, being rotated in a counter clockwise direction in accordance with an embodiment of the present patent application.
Figure 37:
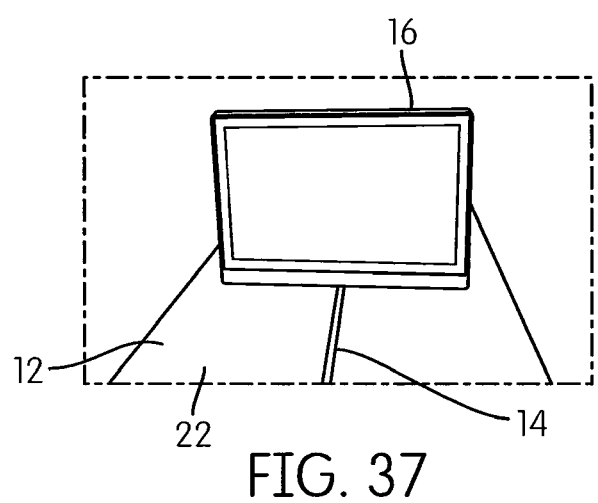
Figure 38:
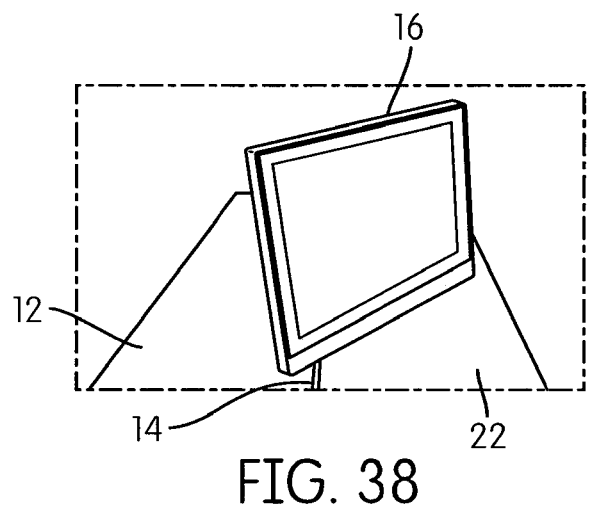

In one embodiment, referring to FIGS. 24-26, when the display device 16 is in the first configuration, the display device 16 may be configured to be movable longitudinally along the length of the table 12. In one embodiment, the movement of the display device 16 may be limited in directions other than longitudinally along the length of the table 12. In one embodiment, the carrier 52 and track 14 are configured to enable the movement of the display device 16 longitudinally along the length of the table 12. In one embodiment, when the display device 16 is in the first configuration, the display device 16 is releasably locked to the mount member 18 by the lock arrangement 72. The display device 16 is movable longitudinally along the length of the table 12 in both directions of the arrow L.

In one embodiment, referring to FIGS. 27-32, when the display device 16 is in the first configuration, the display device 16 may be configured to be rotatable about an axis passing vertically through the table 12 and perpendicular to a longitudinal axis of the table 12. In one embodiment, the display device 16 may be rotated right. In one embodiment, the display device 16 may be rotated left. In one embodiment, the display device 16 may be rotated right to any angle between 0 to 90 degrees. In one embodiment, the display device 16 may be rotated left to any angle between 0 to 90 degrees. In one embodiment, the display device 16 may be rotated in a counter clockwise direction or a clockwise direction.

Figure 39:
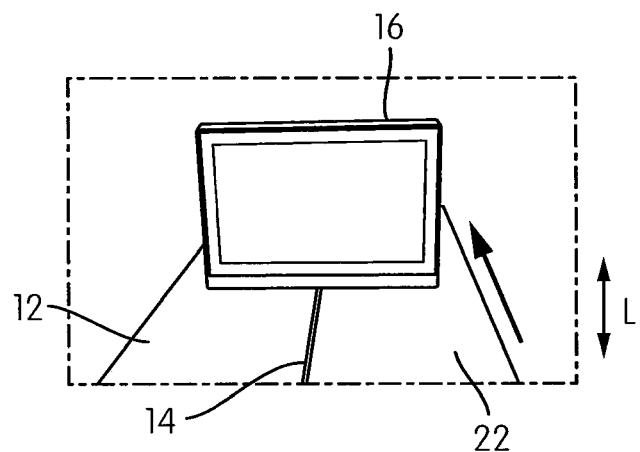
FIGS. 39-40 show the mount member being slidable on the track to different locations on the track to enable the display device, when in its second configuration, to be located at the different locations on the track in accordance with an embodiment of the present patent application.
Figure 40:
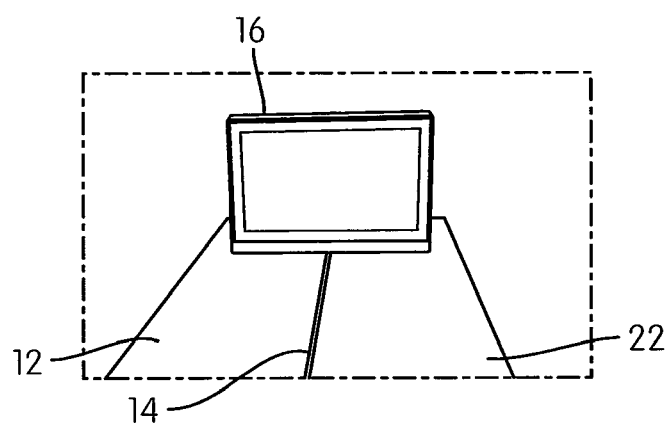

In one embodiment, referring to FIGS. 39-40, when the display device 16 is in the second configuration, the display device 16 may be configured to be movable longitudinally along the length of the table 12. In one embodiment, the movement of the display device 16 may be limited in directions other than longitudinally along the length of the table 12. In one embodiment, the carrier 52 and track 14 are configured to enable the movement of the display device 16 longitudinally along the length of the table 12. The display device 16 is movable longitudinally along the length of the table 12 in both directions of the arrow L.

In one embodiment, referring to FIGS. 33-38, when the display device 16 is in the second configuration, the display device 16 may be configured to be rotatable about an axis passing vertically through the table 12 and perpendicular to a longitudinal axis of the table 12. In one embodiment, the display device 16, in the second configuration, may be rotated right. In one embodiment, the display device 16, in the second configuration, may be rotated left. In one embodiment, the display device 16, in the second configuration, may be rotated right to any angles between 0 to 90 degrees. In one embodiment, the display device 16, in the second configuration, may be rotated left to any angles between 0 to 90 degrees. In one embodiment, the display device 16, in the second configuration, may be rotated in a counter clockwise direction or a clockwise direction.

In one embodiment, the system 10 of the present patent application is provided for client advisors to support interactive advisory of their clients (e.g., customers of a financial or banking institution).

It should be noted that orientational references, such as "upper", "lower", "right", "left", and the like are used for convenience purposes to refer to the orientation with respect to the Figures. These terms are not intended to be limiting, and in practice the various structures may have other orientations. Any patents or applications referred to in this present patent application, including any in the Background section, are incorporated by reference in their entirety into the present patent application.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A display system comprising:
   a table having a top surface;
   a track carried by the table;
   a display device constructed and arranged to display visual content to a user, the display device having a front display surface on which the visual content is displayed to the user and a rear surface;
   a mount member constructed and arranged to mount the display device on the track, the mount member being slidable on the track to different locations on the top surface of the table to enable the display device to be located at said different locations on the top surface of the table; and
   an orienting mechanism constructed and arranged to be operatively connected to the display device and the mount member and to facilitate movement of the display device between a first configuration in which the display device is configured to be positioned substantially parallel to the top surface of the table such that the rear surface of the display device faces the top surface of the table and the front display surface displays the visual content to the user, and a second configuration in which the display device is configured to be substantially inclined with respect to the top surface of the table, the orienting mechanism comprising a biasing mechanism that, when actuated, moves the display device from the first configuration to the second configuration, wherein the display device is configured to be slidable on the track from a first location of the different locations on the top surface of the table to a second location of the different locations on the top surface of the table, and wherein, when the display device is moved to the second location on the top surface of the table, the display device is configured to be positioned in the first configuration, the second configuration or a plurality of intermediate configurations therebetween such that the display device is configured to display the visual content to the user in each of the first configuration, the second configuration and the plurality of intermediate configurations.

2. The display system of claim 1, wherein the orienting mechanism comprises a first hinge member constructed and arranged to be mounted to one of the display device and the mount member, and a second hinge member constructed and arranged to be mounted to the other of the display device and the mount member.

3. The display system of claim 2, wherein the orienting mechanism comprises a shaft constructed and arranged to pivotally connect the first hinge member to the second hinge member.

4. The display system of claim 3, wherein the orienting mechanism comprises a damper having a first member constructed and arranged to fixedly connect the damper to one of the display device and the mount member and a second member connected to the shaft such that movement of the display device between the first and second configurations causes relative motion between the first and the second members of the damper to provide a resistance for controlling the velocity of the display device.

5. The display system of claim 1, wherein the biasing mechanism comprises a torsion spring member, wherein a first end of the torsion spring member is coupled to and rotatable with the display device and a second end of the torsion spring member held against rotation by the mount member.

6. The display system of claim 5, wherein, as the display device is moved from the second configuration to the first configuration, the torsion spring member is subject to a torsional deflection or twist.

7. The display system of claim 6, wherein, as the display device is moved from the first configuration to the second configuration, the energy stored as torsional deflection of the torsion spring member is configured to assist the display device in being moved to the second configuration.

8. The display system of claim 5, wherein the orienting mechanism comprises a damper having a first member constructed and arranged to fixedly connect the damper to one of the display device and the mount member and a second member connected to the torsion spring member such that movement of the display device between the first and second configurations causes relative motion between the first and the second members of the damper to provide a resistance for controlling the velocity of the display device.

9. The display system of claim 1, wherein the track is disposed centrally on the table and extends parallel to a longitudinal axis of the table.

10. The display system of claim 1, further comprising a carrier slidably received within or on the track, the carrier being configured to support the mount member on the track and to slidably move the mount member and the display device mounted thereon on the track.

11. The display system of claim 10, wherein a portion of the carrier is constructed and arranged to be engaged with a portion of the mount member such that the mount member is generally mounted on the carrier.

12. The display system of claim 10, wherein the carrier is configured to have a single center of rotation that allows for a 90 degree left side rotation of the mount member and the display device mounted thereon or a 90 degree right side rotation of the mount member and the display device mounted thereon.

13. The display system of claim 10, wherein the carrier is configured to be linearly driven along the track by a drive mechanism to slide the mount member along the track.

14. The display system of claim 1, wherein, when the mount member and the display device mounted thereon are slid to a certain location on the track, the mount member and the display device are configured to remain in that location by virtue of their own weight until an external force is applied to the display device.

15. The display system of claim 1, wherein, when the display device is in the first configuration or in the second configuration, the display device is configured to be rotatable about an axis passing vertically through the table and perpendicular to a longitudinal axis of the table.

16. The display system of claim 1, wherein, when the display device is in the first configuration or in the second configuration, the display device is configured to be rotatable to any angle between 0 to 90 degrees to the right or to the left.

17. The display system of claim 1, wherein, when the display device is in the first configuration or in the second configuration, the display device is configured to enable the user to view the visual content displayed on the display device from a plurality of viewing angles and/or a plurality of viewing positions around the table.

18. The display system of claim 1, wherein the orienting mechanism is configured to raise the display device from the first configuration to the second configuration with the biasing mechanism of the orienting mechanism generating a moment of force.

19. The display system of claim 1, wherein the display device is configured to be releasably locked in the first configuration in which the display device is positioned substantially parallel to the top surface of the table.

20. The display system of claim 1, wherein the mount member comprises a channel that is configured to receive and accommodate electrical and/or communication cables therein.

21. The display system of claim 1, wherein the mount member is coated on its underside or bottom surface with a self-lubricating material that facilitates sliding of the mount member between different locations on the top surface of the table.

22. The display system of claim 1, further comprising a lock mechanism configured to lock the mount member at a desired location of the different locations on the top surface of the table after the mount member and the display device mounted thereon are slid to the desired position on the top surface of the table.

* * * * *